United States Patent
Miura et al.

(10) Patent No.: US 7,893,581 B2
(45) Date of Patent: Feb. 22, 2011

(54) MOTOR MODULE

(75) Inventors: Tetsuya Miura, Nishikamo-gun (JP); Hirotatsu Ihara, Nagoya (JP); Takamasa Takeuchi, Anjo (JP); Masamitsu Senoo, Anjo (JP); Akihiro Tanaka, Nishio (JP); Takafumi Koshida, Anjo (JP); Tomoo Atarashi, Kariya (JP)

(73) Assignees: Toyota Jidosha Kabushiki Kaisha, Aichi-ken (JP); Aisin Aw Co., Ltd., Aichi-ken (JP)

( * ) Notice: Subject to any disclaimer, the term of this patent is extended or adjusted under 35 U.S.C. 154(b) by 221 days.

(21) Appl. No.: 12/307,229

(22) PCT Filed: Jul. 11, 2007

(86) PCT No.: PCT/JP2007/064133

§ 371 (c)(1),
(2), (4) Date: Dec. 31, 2008

(87) PCT Pub. No.: WO2008/007806

PCT Pub. Date: Jan. 17, 2008

(65) Prior Publication Data

US 2009/0256437 A1    Oct. 15, 2009

(30) Foreign Application Priority Data

Jul. 12, 2006    (JP)    .............................. 2006-191334

(51) Int. Cl.
    *H02K 5/22*    (2006.01)
(52) U.S. Cl. .......................................... 310/71; 310/112
(58) Field of Classification Search .................. 310/71, 310/112, 89
    See application file for complete search history.

(56) References Cited

U.S. PATENT DOCUMENTS

| 5,914,548 | A  | * | 6/1999 | Watanabe et al. | ............. | 310/88 |
| 6,664,678 | B2 | * | 12/2003 | Shimizu | ...................... | 310/71 |
| 7,607,220 | B2 | * | 10/2009 | Reed et al. | .................... | 29/825 |
| 2002/0079763 | A1 | * | 6/2002 | Fleshman et al. | ............. | 310/87 |
| 2005/0208782 | A1 |  | 9/2005 | Reed et al. | | |

FOREIGN PATENT DOCUMENTS

| JP | 2004-120961 A | 4/2004 |
| JP | 2004-222354 A | 8/2004 |
| JP | 2005-151660 A | 6/2005 |
| JP | 2005-160190 A | 6/2005 |
| JP | 2005-229755 A | 8/2005 |

* cited by examiner

*Primary Examiner*—Burton Mullins
(74) *Attorney, Agent, or Firm*—Sughrue Mion, PLLC

(57) ABSTRACT

First and second connection mechanisms electrically connect power cables extending in the same direction to first and second electric motor neighboring to each other in the extending direction of the power cables, respectively. The first connection mechanism of the first electric motor is arranged in a radially outer portion, and the second connection mechanism of the second electric motor is arranged in a space between the electric motors. Since both the connection mechanisms are located on the opposite sides of a joint surface between the first and second casings accommodating the first and second motors, respectively, the first and second connection mechanisms can be components on the first and second casing sides, respectively. This structure can prevent increase in size in a rotation axis direction, and can improve assembly workability for the motors.

10 Claims, 14 Drawing Sheets

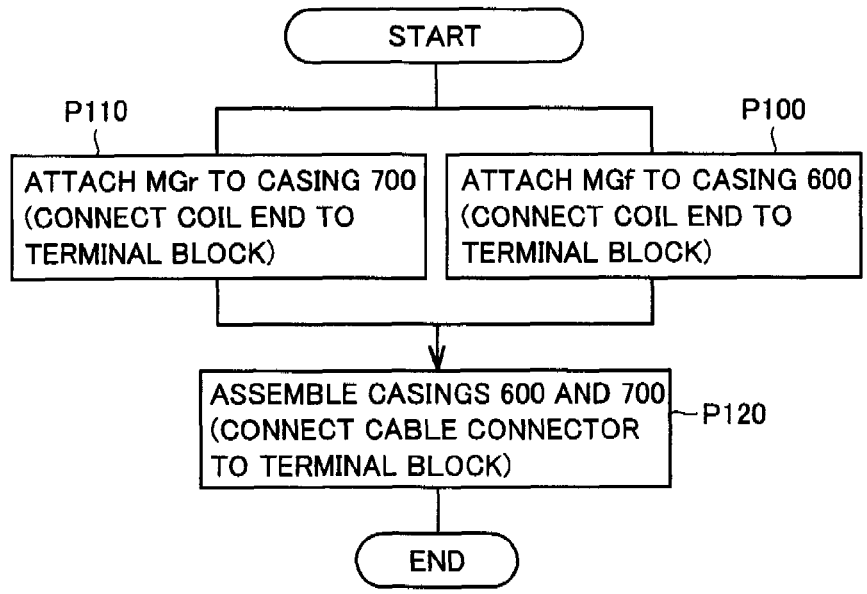
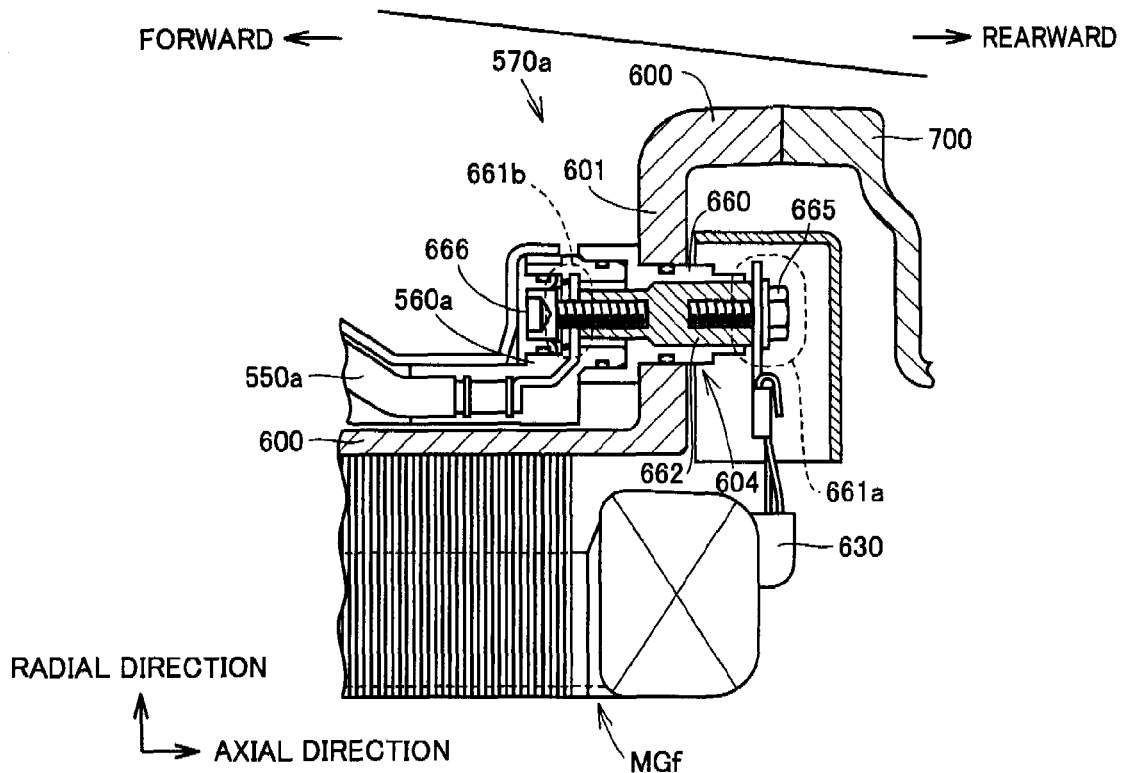

MOTOR MODULE

TECHNICAL FIELD

The invention relates to a motor module, and particularly to a motor module having a plurality of electric motors that neighbor to each other in a direction of a rotor rotation axis.

BACKGROUND ART

Vehicles such as an electric vehicle and a hybrid vehicle that are equipped with electric motors (including motors and motor generators in this invention) as drive power sources have been developed. These vehicles generally have a structure in which an electric motor is accommodated in a casing for protecting the electric motor from an external environment or for housing the electric motor integrally with a transmission and thereby sealedly keeping its Automatic Transmission Fluid (ATF). Since an electric power supply of the electric motor is arranged outside the casing, a mechanism is required for electrically connecting this power supply to the electric motor in the casing.

For example, Japanese Patent Laying-Open No. 2004-120961 (Patent Document 1) has disclosed a structure in which a connection unit for electrical connection between an electric motor in a casing and a power cable is spaced in an axial direction (of a rotor rotation axis) from a coil end of the electric motor so that this connection unit can be arranged in a position not restricted by a position of the electric motor coil, and thereby an outer diameter of the structure can be reduced as far as possible.

Japanese Patent Laying-Open No. 2005-229755 (Patent Document 2) has disclosed a structure in which a terminal block for connecting a varnished motor winding to a power cable is arranged on a side surface of an electric motor with respect to a rotor rotation axis direction, and particularly a structure in which a flexible member is arranged on an end of the motor winding so that fixing to the terminal block is performed by canceling tolerances of parts by deformation of the flexible member. Further, Japanese Patent Laying-Open No. 2005-151660 (Patent Document 3) has disclosed a structure for reducing an arrangement space of an electric motor as far as possible. In this structure, a terminal block for connecting a motor winding to a power cable is arranged on a side surface of an electric motor with respect to a rotor rotation axis direction, and is located radially inside an outer peripheral surface of a casing of the electric motor.

Further, U.S. Patent Publication No. 2005/0208782 (Patent Document 4) has disclosed a structure in which a motor generator of a hybrid transmission is connected to an interconnection arranged outside a transmission housing through an opening formed at the housing.

As one of forms of the motor modules, there is a structure including a plurality of electric motors as disclosed in the Patent Document 1. In this structure, for reducing a whole size of motor module, an important matter arises in a connection structure between the electric motor and the external power supply, and more specifically in a manner of arrangement of the connection mechanism between the power cable and a stator coil winding of each electric motor.

Particularly, in the structure having a plurality of electric motors that have the rotation axes in the same direction and neighbor to each other in the rotor rotation axis direction, a plurality of power supplies of the electric motors are generally arranged in one position, and it is necessary to devise a connection mechanism of the power cables that extend from the same side of the plurality of electric motors to the plurality of electric motors.

In connection with this, the Patent Document 1 has disclosed the foregoing connection mechanism in which the terminal blocks of the two electric motors are spaced from the coil ends. However, this structure increases a length of the motor module in the rotor rotation axis direction, and may impair mountability. Since the two electric motors are accommodated in the same casing, assembly operations for the respective electric motors cannot be performed in parallel without difficulty. This may cause complication of the assembly operations as well as increase in time required for them, and thus may deteriorate productivity. In Patent Documents 2 and 3, no consideration is given to the structure that has the plurality of electric motors neighboring to each other.

Further, if the connection structure for the power cable and the electric motor has an opening in the housing or casing as disclosed in the Patent Document 4, this may cause disadvantages such as increase in number of parts for a sealing structure and oil leakage due to insufficient sealing property.

DISCLOSURE OF THE INVENTION

The invention has been made for overcoming the above problems, and an object of the invention is to provide a motor module that is provided with a plurality of electric motors neighboring to each other in a rotation axis direction, and particularly to provide a structure of connection mechanisms between power cables and electric motors that can prevent increase in size in the rotation axis direction and can improve assembly workability.

A motor module according to the invention includes first and second electric motors neighboring to each other in a rotor rotation axis direction, a first casing for accommodating the first electric motor, a second casing for accommodating the second electric motor, joining means, and first and second connection mechanisms. The joining means joins the first and second casings accommodating the first and second electric motors, respectively, to each other. The first connection mechanism is configured to electrically connect a first power cable supplying an electric power to the first electric motor to the first electric motor. The second connection mechanism is configured to electrically connect a second power cable supplying an electric power to the second electric motor to the second electric motor. The first and second power cables are arranged from the same side in the rotor rotation axis direction. The first connection mechanism is arranged using a space radially outside the first electric motor, and the second connection mechanism is arranged using a space between the first and second electric motors neighboring to each other.

In the above motor module, the connection mechanisms are arranged between the first and second electric motors neighboring to each other in the rotor rotation axis direction and the power cables extending from the same side in the rotor rotation axis direction with respect to these electric motors, respectively, and particularly are arranged as follows. Thus, one of the connection mechanisms is arranged radially outside the electric motor corresponding to the other connection mechanism, and the other connection mechanism is arranged using a space between these electric motors. Thereby, it is possible to prevent increase in size in the rotation axis direction of the motor module and to improve the assembly workability owing to the fact that connecting operations for the connection mechanisms and the corresponding electric motors can be executed independently of each other before joining the first and second casings.

Preferably, the first connection mechanism is arranged at the first casing, and the second connection mechanism is arranged at the second casing.

Thereby, when the operations of attaching the first and second electric motors to the first and second casings, respectively, are executed independently, the operation of electrically connecting each motor to the corresponding connection mechanism can be executed. Further, in the later operation of joining both the casings together, it is possible to perform the operation of electrically connecting each power cable to the corresponding connection mechanism. Consequently, it is possible to improve the workability of the motor module assembly operation including the connection between the power cables and the electric motors.

Further preferably, the first and second casings are configured to form an internal space continuing in the first and second casings joined together, and a joint surface between the casings is formed of a single plane without irregularities.

This structure can enhance the sealing property of the space inside the joined casings. For example, it is possible to prevent leakage of a working fluid (e.g., automatic transmission fluid) or the like filling the inner space.

Further preferably, the first connection mechanism includes a terminal block, and a first fixing member. The terminal block is electrically connected to the first power cable when the first power cable is connected to the first connection mechanism. The first fixing member fastens a lead line of a coil end of the first electric motor to the terminal block and thereby connects electrically the terminal block to the lead line. The lead line fastened to the terminal block extends across the rotor rotation axis direction.

This structure can reduce a required space in the rotation axis direction of the first connection mechanism.

Further preferably, the first casing has a form extending outward beyond an outer peripheral surface of the first electric motor, and has a wall portion provided with a through-hole for extending the terminal block through the through-hole in the rotor rotation axis direction. The terminal block includes first and second coupling units. The first coupling unit is coupled to the lead line in a position inside the first casing and inner than the wall portion. The second coupling unit is coupled to the first power cable in a position outside the first casing.

Owing to the above structure, the power cable can be coupled, in a position outside the first casing, to the terminal block that is already attached to the first casing. Therefore, a process of joining the power cable to the motor module can be independently performed after an assembly operation for the motor module is completed by coupling the power cable from the outside of the first casing to the terminal block already attached to the first casing. Consequently, the motor module can be transported independently of the power cables after the motor module is assembled. Therefore, the power cable can be protected more effectively than the case where the motor module and the power cables already coupled to the motor module are collectively transported. Further, the power cable can be connected to the terminal block without forming an opening (service hole) at the casing. Therefore, it is possible to prevent increase in number of parts for sealing as well as oil leakage due to lowering of a sealing property.

Further preferably, the terminal block is configured to be attached to the first casing in the same direction, with respect to the rotor rotation axis direction, as that of fastening the lead line to the terminal block by the first fixing member.

Thereby, after the first electric motor is attached to the first casing, the operation of attaching the first casing to the terminal block and the operation of connecting the lead line to the terminal block can be performed in the same direction without inverting the first electric motor and the first casing.

Particularly, in the above structure, the first connection mechanism further includes a second fixing member configured to connect electrically the first power cable and the terminal block together by fixing the first power cable to the terminal block. The second fixing member fixes the first power cable to the terminal block in a direction perpendicular to the rotor rotation axis direction in the second coupling unit.

Thereby, even in the case where the diameter of the first casing varies as the position moves in the rotor rotation axis direction, an operation space can be ensured in a direction perpendicular to the rotor rotation axis direction, which can facilitate the operation of coupling the first power cable to the terminal block. Thus, the workability is improved.

Alternatively, the terminal block has a convex portion protruding toward an outside of the first casing through the through-hole in the rotor rotation axis direction, and the first power cable has a connector unit of a concave form complementary to the convex portion. The convex portion is fitted to the convex form of the connector unit in the second coupling unit.

Owing to the above structure, the power cable and the convex portion of the terminal block can be arranged substantially coaxially with each other so that the radial size of the coupling unit can be small. Also, the connector unit of the power cable can be sealed by attaching a rubber ring or the like thereto without requiring molding (integral formation) so that the cost can be low.

Alternatively, the terminal block includes first and second terminal block units. The first terminal block unit is arranged to extend through the through-hole in the rotor rotation axis direction and has the first coupling unit. The second terminal block unit is coupled to the first terminal block unit in a position outside the first casing, and has the second coupling unit.

Thereby, in a process of designing the motor modules corresponding to various types, various forms are designed using the second terminal blocks as adapters so that the power cables or both the power cables and the first terminal block units can be standardized in the design stage, and the standardization of the parts for various types can reduce the cost.

Further, the terminal block further includes fixing means for fixing the second terminal block unit to the first terminal block unit.

This structure does not require the operation of attaching the second terminal block unit to the first casing from the outside of the first casing, and thereby can facilitate the operation of completing the terminal block by integrating the first and second terminal block units together. Further, tapping for attaching fixing members (bolts or the like) to the first casing is not required so that the workability or processability of the casing is improved.

According to the invention, the motor module provided with the plurality of electric motors neighboring to each other in the rotation axis direction can have the connection mechanism between the power cable and the electric motor such that the increase in size in the rotation axis direction can be prevented and the assembly workability can be improved.

BRIEF DESCRIPTION OF THE DRAWINGS

FIG. 10 is a flowchart illustrating an assembly process of the motor module according to the embodiment of the invention.

FIG. 11 schematically shows a first example of a connection mechanism of a motor module according to a modification of the embodiment of the invention.

BEST MODES FOR CARRYING OUT THE INVENTION

Embodiments of the invention will now be described with reference to the drawings. In the following description, the same or corresponding portions bear the same reference numbers, and description thereof is not repeated.

Figure 1:
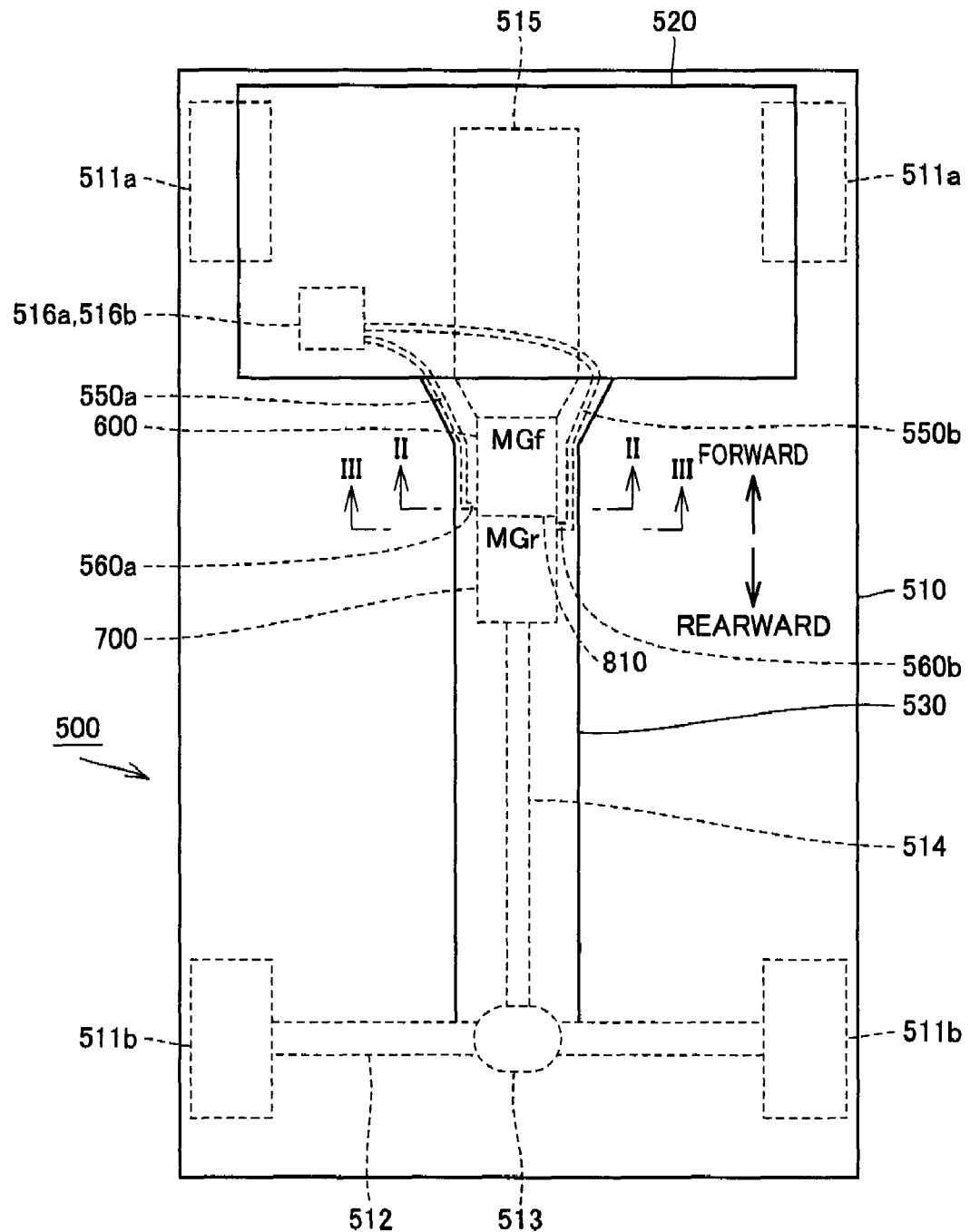
FIG. 1 is a schematic block diagram showing a structure of a hybrid vehicle that is an example of a structure equipped with a motor module according to the invention.

FIG. 1 is a schematic block diagram showing a structure of a hybrid vehicle that is an example of a structure equipped with a motor module according to the invention. FIG. 1 shows an example in which the motor module is mounted on the hybrid vehicle of an FR (Front-engine Rear-drive) type having two electric motors (motor generators) neighbor to each other in an axial direction (a longitudinal direction of a vehicle).

Referring to FIG. 1, a hybrid vehicle 500 of the FR type includes a chassis 510. An engine compartment 520 in which an engine 515 is arranged and a tunnel 530 communicated with engine compartment 520 are formed by chassis 510. Front and rear wheels 511a and 511b are arranged at four corners of chassis 510, respectively.

Engine compartment 520 is a space located between front wheels 511a for arranging engine 515 therein. In an example shown in FIG. 1, engine 515 has a length longitudinal axis in a vehicle-advancing direction, and thus is of a so-called "length side" type. However, the type of engine 515 is not specifically restricted, and various usual types of engines such as an in-line, V-type and horizontally opposed type may be employed. Further, engine 515 may be a gasoline engine or a diesel engine. Further, it may be an engine using a gas other than them as fuel.

Hybrid vehicle 500 further includes, as a drive unit, a propeller shaft 514 and electric motors MGf and MGr. Electric motors MGf and MGr are accommodated in casings 600 and 700, respectively, and neighbor to each other in a direction of a rotor rotation axis (i.e., a longitudinal direction of the vehicle). Electric motors MGf and MGr are typically formed of three-phase AC motors, respectively.

Propeller shaft 514 and electric motors MGf and MGr are arranged using tunnel 530 communicated with engine compartment 520. In other words, tunnel 530 is a space formed by deforming chassis 510 for accommodating electric motors MGf and MGr as well as propeller shaft 514.

Casings 600 and 700 that accommodate electric motors MGf and MGr, respectively, are joined together through a mating surface (joint surface) 810, and thereby form a motor module provided with electric motors MGf and MGr. In this motor module, a transmission (i.e., a planetary gear for splitting and others) that can transfer outputs to/from rotor output shafts of electric motors MGf and MGr, an output shaft (not shown) of engine 515 and propeller shaft 514 is arranged in internal spaces of casings 600 and 700 that are integrally joined together. The above mechanism is substantially the same as that of the Patent Document 1 (FIG. 1).

For example, the output of electric motor MGr is transmitted to rear wheels 511b via propeller shaft 514, a differential gear 513 and axles 512. Hybrid vehicle 500 has engine 515 arranged in the front of the vehicle. However, the engine may be arranged in another position such as a central position of the vehicle.

Inverters 516a and 516b for supplying the electric power to electric motors MGf and MGr are arranged in an area inside engine compartment 520. Inverters 516a and 516b convert a DC power supplied from a DC power supply that is formed of a secondary battery, fuel battery, electrical double layer capacitor or the like into an AC power for driving electric motors MGf and MGr according to an operation instruction. Electric motors MGf and MGr may be formed of motor generators each having a function as a power generator, in which case inverters 516a and 516b convert the AC powers generated by electric motors MGf and MGr into DC powers to be supplied to a chargeable DC power supply.

For achieving a compact structure of the power supply, it is preferable that inverters 516a and 516b are arranged integrally with each other (and typically, in the same unit). The positions of inverters 516a and 516b are not restricted to those exemplified in FIG. 1, and these may be arranged on the right side of engine 515 or coaxially with engine 515. Further, inverters 516a and 516b may be arranged on the rear side of the vehicle with respect to electric motors MGf and MGr.

Accordingly, power cables 550a and 550b for connecting inverters 516a and 516b to electric motors MGf and MGr, respectively, extend in engine compartment 520 and tunnel 530, and are located on the same side (front side of the vehicle in the example in FIG. 1) with respect to electric motors MGf and MGr that neighbor to each other in the longitudinal direction of the vehicle. Power cables 550a and 550b may be replaced with bus bars or the like that are made of flat plate-like metal members provided that these can ensure electrical connections.

Power cables 550a and 550b are provided at their ends with connector units 560a and 560b, respectively. In the example of this embodiment, the motor module is formed of two electric motors MGf and MGr, but it may be formed of three or more electric motors.

Figure 2:
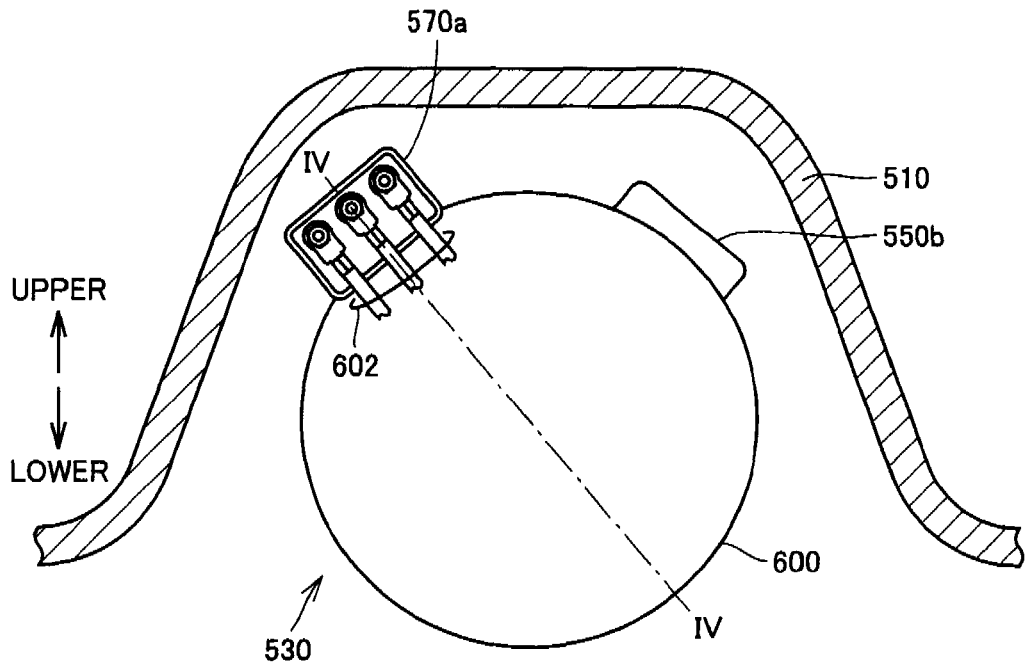
FIG. 2 is a schematic cross section taken along line II-II in FIG. 1 and showing an arrangement of a connection mechanism between a front electric motor and a power cable shown in FIG. 1.

FIG. 2 is a cross section taken along line II-II in FIG. 1, and illustrates an arrangement of a connection mechanism for front electric motor MGf and power cable 550a.

Referring to FIG. 2, chassis 510 has a protruding portion, which form tunnel 530. Tunnel 530 has a section of a protruding form, which can reinforce chassis 510. FIG. 2 does not show a sectional structure inside casing 600.

A connection mechanism 570a between electric motor MGf and connector unit 560a is arranged in a space outside an outer peripheral surface of the portion of casing 600 accommodating electric motor MGr. Connection mechanism 570a electrically connects connector unit 560a of power cable 550a to a stator coil winding 602 of electric motor MGf. Connection mechanism 570a is arranged on an upper side in view of rebounding stones under the vehicle.

Figure 3:
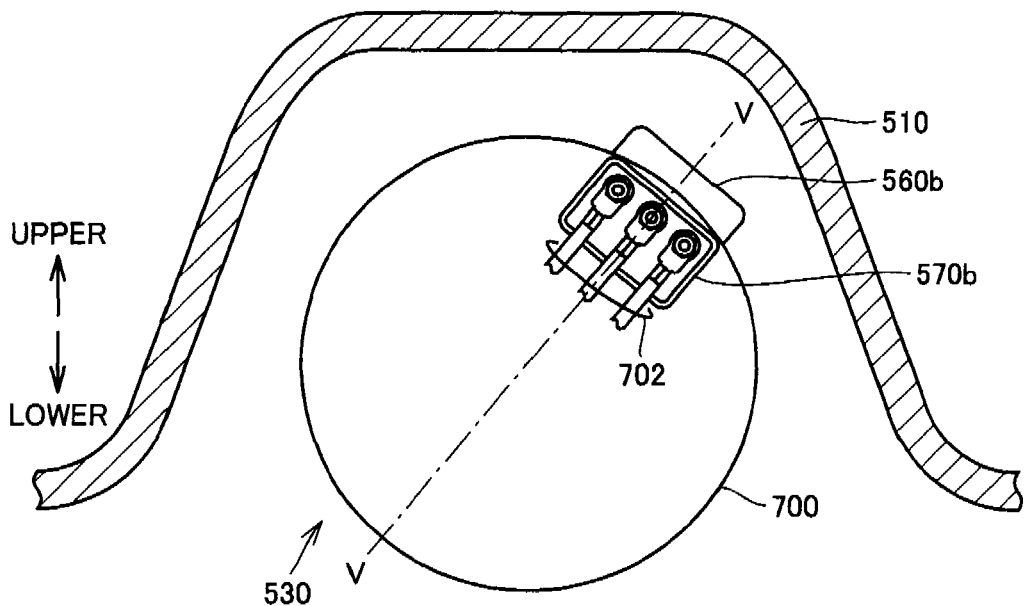
FIG. 3 is a schematic cross section taken along line III-III in FIG. 1 and showing an arrangement of a connection mechanism between a rear electric motor and the power cable shown in FIG. 1.

Likewise, FIG. 3 is a cross section taken along line III-III in FIG. 1, and illustrates an arrangement of a connection mechanism between rear electric motor MGr and power cable 550b. FIG. 3 does not show a sectional structure inside casing 700.

Referring to FIG. 3, a connection mechanism 570b between a stator coil winding 702 of electric motor MGr and connector unit 560b is arranged inside an outer peripheral surface of the portion of casing 700 accommodating electric motor MGr. As will be described later in detail, connection mechanism 570b is arranged using a space between electric motors MGf and MGr neighboring to each other.

In view of the arrangement of power cables 550a and 550b, it is preferable that connection mechanism 570b is arranged within an area on the upper side similarly to connection mechanism 570a, and particularly in a position that is shifted from connector unit 560a in a circumferential direction of casings 600 and 700.

The arrangement and structure of connection mechanisms 570a and 570b will now be described further in detail.

Figure 4:
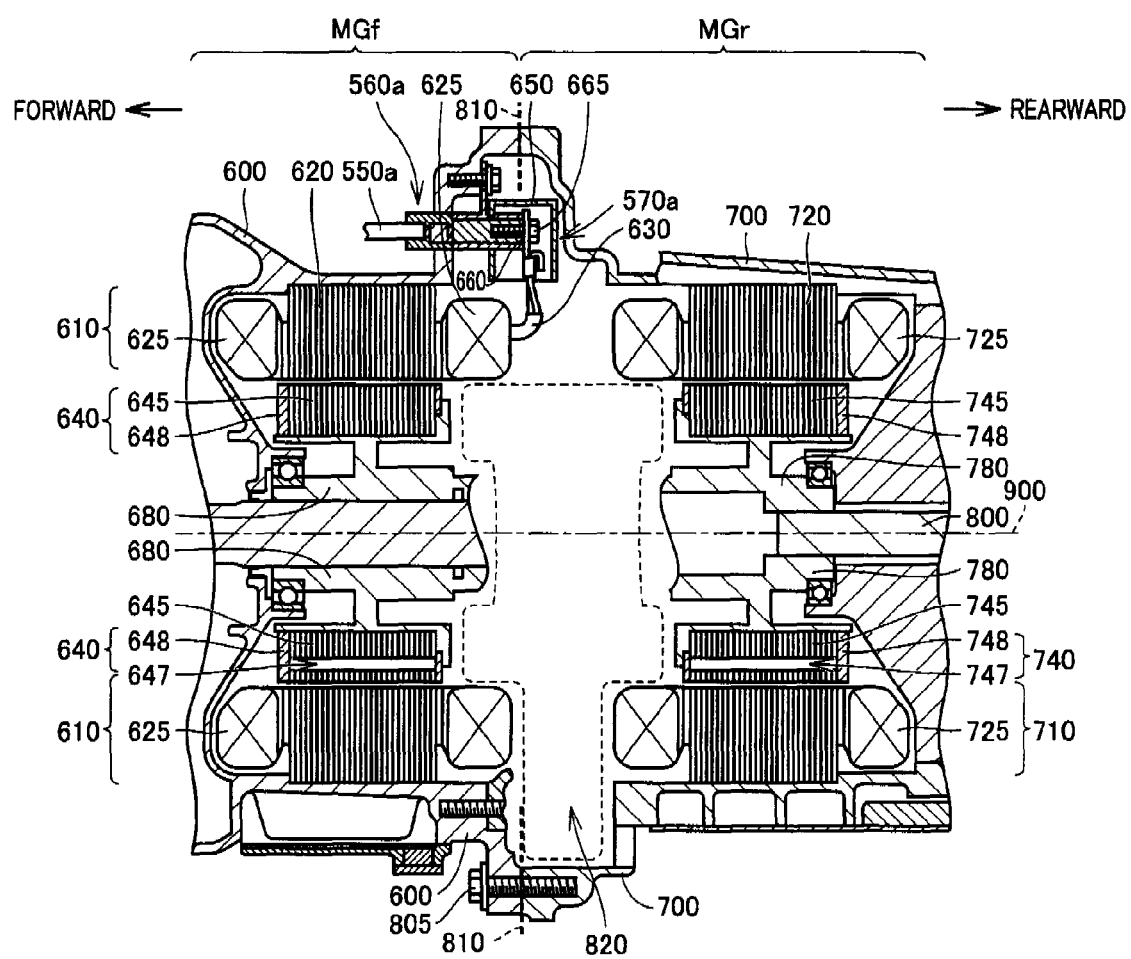
FIG. 4 is a cross section taken along line IV-IV in FIG. 2 and showing an arrangement and structure of the connection mechanism shown in FIG. 2.

FIG. 4 is a cross section taken along line IV-IV in FIG. 2 and illustrates the arrangement and structure of connection mechanism 570a.

Referring to FIG. 4, electric motor MGf includes a stator 610 and a rotor 640 that are accommodated in casing 600. Stator 610 has a stator core 620 formed of a stack of steel plates, and a stator coil winding wound around stator core 620. A lead line 630 extends from a coil end 625 of the stator coil winding.

Rotor 640 has a rotor core 645 formed of a stack of steel plates fixed by an end plate 648. A permanent magnet (not shown) is fitted into a magnet hole 647 extending through rotor core 645. Rotor 640 is connected to a rotor output shaft 680. The AC power supplied through power cable 550a causes stator 610 to produce a rotating magnetic field, which generates a rotative force of rotor output shaft 680 according to rotation of rotor 640 around a rotor rotation axis 900.

Electric motor MGr has substantially the same structure as electric motor MGf, and includes a stator 710 and a rotor 740 that are accommodated in casing 700. Stator 710 is formed of a stator core 720 formed of a stack of steel plates, and a stator coil winding (of which coil end is indicated by a reference 725) wound around stator core 720. Rotor 740 has a rotor core 745 formed of a stack of steel plates fixed by an end plate 748. A permanent magnet (not shown) is fitted into a magnet hole 747 extending through rotor core 745. Rotor 740 is connected to a rotor output shaft 780. The AC power supplied through power cable 550b causes stator 710 to produce a rotating magnetic field, which generates a rotative force of rotor output shaft 780 according to rotation of rotor 740 around rotor rotation axis 900.

Casings 600 and 700 are joined integrally together by joint members 805 (typically, bolts). Hollow spaces of casings 600 and 700 thus joined form an integral inner space that continuously extend in both the casings. As shown in the figure, electric motors MGf and MGr are arranged in this inner space and neighbor to each other in the direction of rotor rotation axis 900 (which may be simply referred to as an "rotation axis direction" hereinafter). Further, gears and the like for transmitting the rotative force(s) of rotor output shaft(s) 680 and/or 780 to an output shaft 800 (coupled to propeller shaft 514) are arranged using a space (e.g., an area 820) in the internal space except for the areas where electric motors MGf and MGr are arranged. Since the inner space is filled with the working fluid (ATF), a sealing property for preventing leakage of the working fluid must be ensured at circumferentially annular joint surface 810 between casings 600 and 700.

Connection mechanism 570a has a terminal box 650 arranged radially outside an outer peripheral surface of a portion of casing 600 accommodating electric motor MGf, a terminal block 660 formed of an electrical conductor and a fixing member 665. Terminal block 660 is arranged inside terminal box 650, and can be electrically connected to connector unit 560a of power cable 550a by a fitting structure and a fixing member (both not shown). Thus, terminal block 660 is electrically connected to power cable 550a when connector unit 560a (power cable 550a) is connected to connection mechanism 570a.

Fixing member 665 is formed of a set of bolt and nut or the like, and fastens lead line 630 to terminal block 660 for electrical connection between lead line 630 and terminal block 660. Thus, fixing member 665 corresponds to a "first fixing member" in the invention. In particular, lead line 630 is bent when necessary so that lead line 630 extends across the rotation axis direction and is connected to terminal block 660. This structure can reduce a size of connection mechanism 570a in the rotation axis direction.

Figure 5:
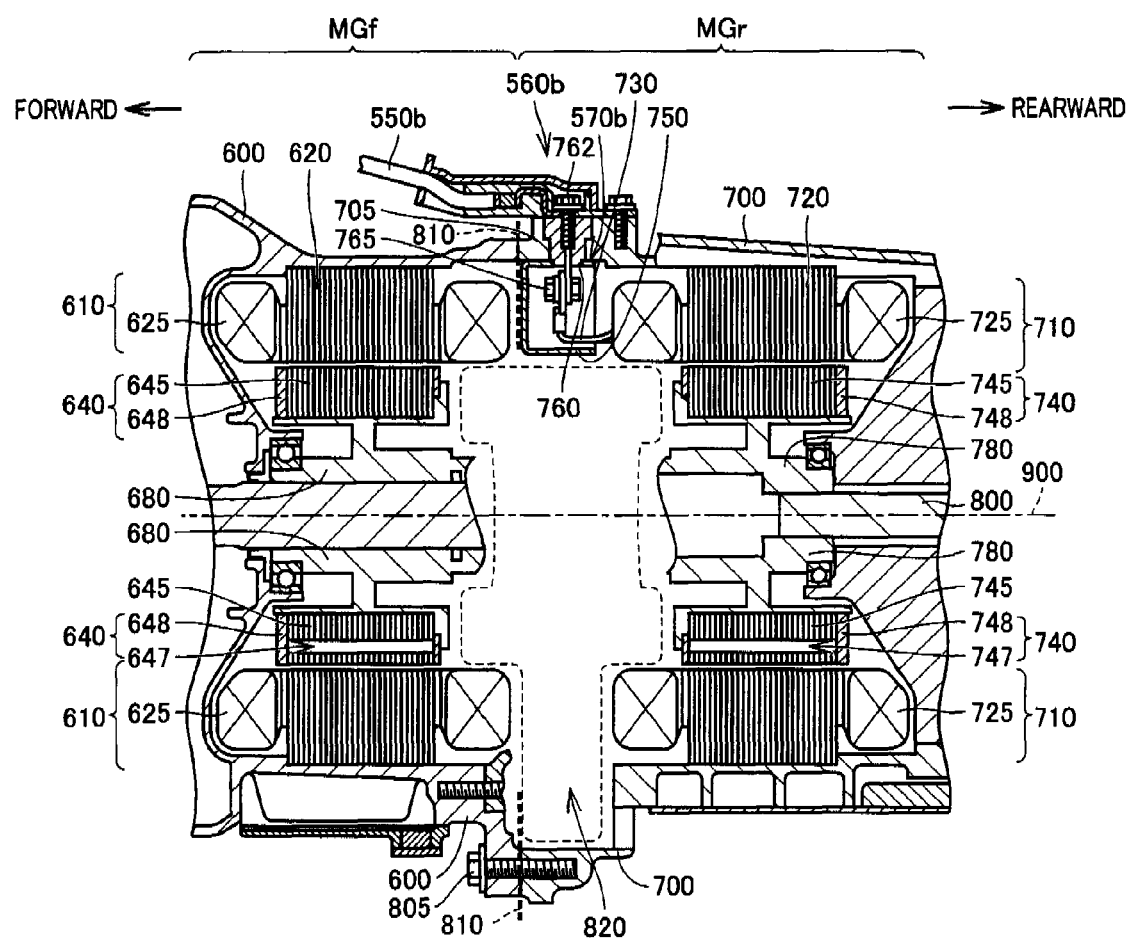
FIG. 5 is a cross section taken along line V-V in FIG. 3 and showing the arrangement and structure of the connection mechanism shown in FIG. 3.

FIG. 5 is a cross section taken along line V-V in FIG. 3 and shows an arrangement and a structure of connection mechanism 570b.

Referring to FIG. 5, connection mechanism 570b has a terminal box 750 that is arranged using a space in the rotation axis direction between electric motors MGf and MGr, a terminal block 760 formed of a conductor and a fixing member 765. These components of connection mechanism 570b are located radially inside an outer peripheral surface of a portion of casing 700 accommodating electric motor MGr. Terminal block 760 is arranged inside terminal box 750, and can be electrically connected to connector unit 560b of power cable 550b by a fitting structure and a fixing member (both not shown). Thus, terminal block 760 is electrically connected to power cable 550b when connector unit 560b (power cable 550b) is connected to connection mechanism 570b.

Fixing member 765 has substantially the same structure as fixing member 665, and fastens a lead line 730 to terminal block 760 for electrically connecting lead line 730 of coil end 725 to terminal block 760. Similarly to connection mechanism 570a, lead line 730 is bent when necessary so that it extends across the rotation axis direction and is connected to terminal block 760.

Then, the motor module according to the embodiment is compared with motor modules of comparison examples in connection with an arrangement of the connector unit (connection mechanism).

Figure 6:
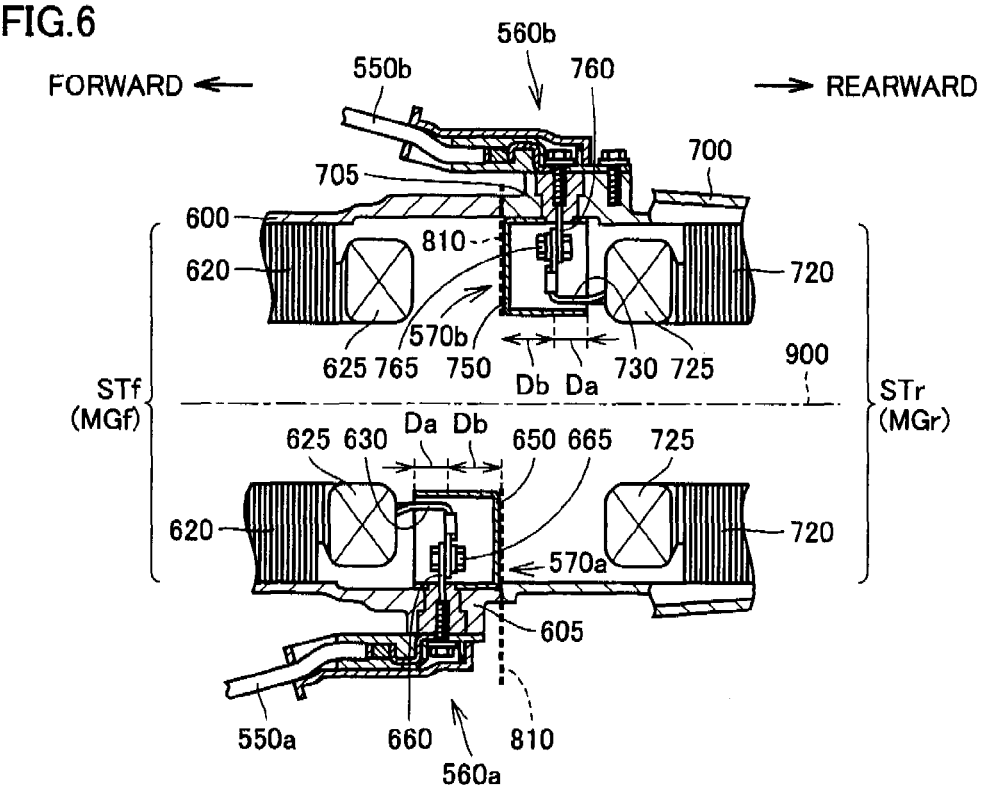
FIG. 6 schematically shows an arrangement of a connection mechanism of a motor module according to a first comparison example.
Figure 7:
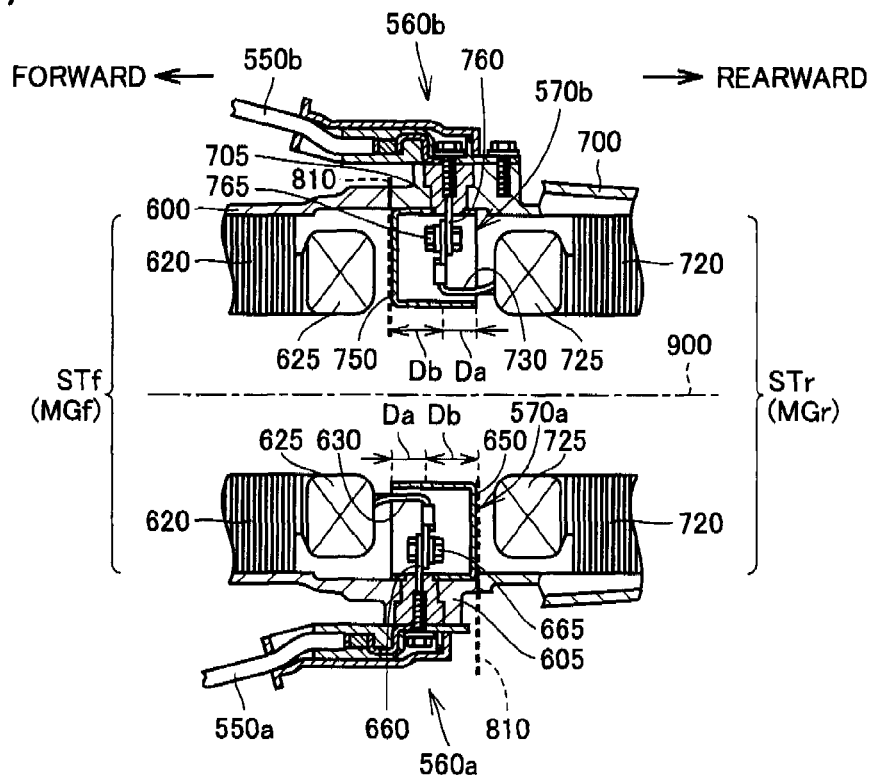
FIG. 7 schematically shows an arrangement of a connection mechanism of a motor module according to a second comparison example.

FIGS. 6 and 7 show the arrangement of the connection mechanisms in the motor modules each having both connection mechanisms 570a and 570b arranged in the space (in the rotation axis direction) between electric motors MGf and MGr.

Referring to FIG. 6, each of connection mechanisms 570a and 570b requires a size of a sum (Da+Db) of an insulation distance Da from coil end 625 or 725 to the connection point (fixing member 665 or 765) and a required distance Db from the connection point (fixing member 665 or 765) to joint surface 810. Required distance Db corresponds to a thickness that is required for ensuring a sealing property of a remaining portion 605 or 705 of the portion for installing terminal box 650 or 750.

Figure 9:
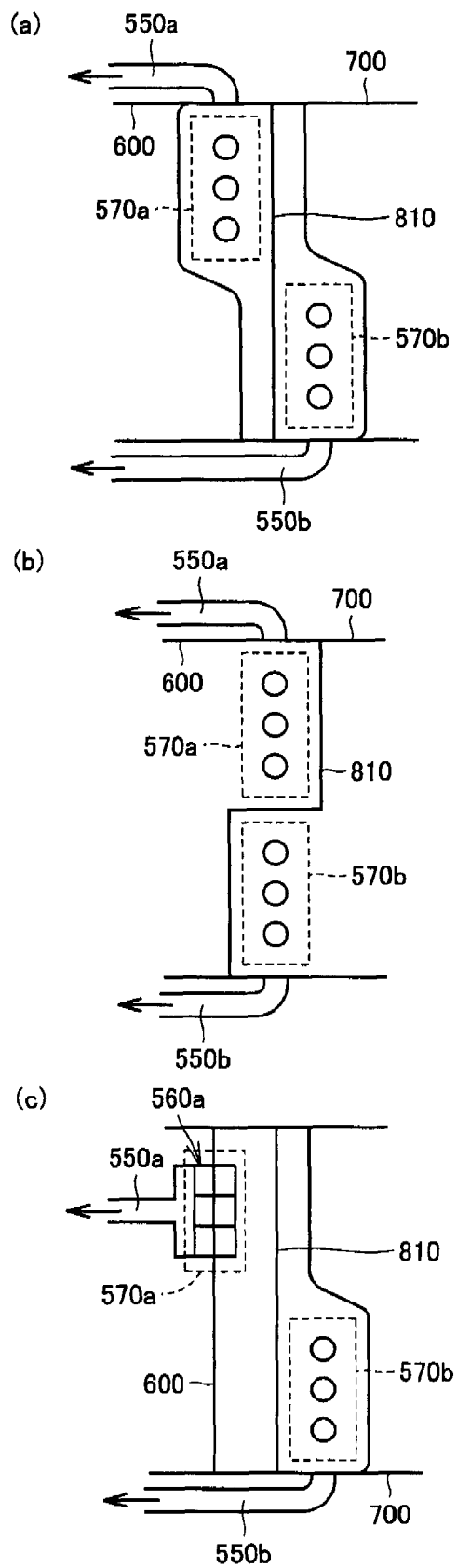
FIG. 9 conceptually shows a joint surface between casings of the motor module shown in FIGS. 6 to 8 and particularly shows the joint surface viewed from a radially outer side.

In a first comparison example shown in FIG. 6, connection mechanisms 570a and 570b are arranged in different positions in the rotation axis direction, respectively, so that a space required for electric motors MGf and MGr increases in the rotation axis direction due to arrangement of connection mechanisms 570a and 570b, and must have a size of at least (2×(Da+Db)). In the first comparison example, however, the position in the rotation axis direction of joint surface 810 is constant in both connection mechanisms 570a and 570b. Therefore, whole joint surface 810 between casings 600 and 700 can be a single flat surface not including irregularities as shown at (a) in FIG. 9 so that the sealing property of the internal space can be ensured.

In a second example shown in FIG. 7, connection mechanisms 570a and 570b are arranged in the same position in the rotation axis direction within the space between electric motors MGf and MGr so that the space required in the rotation axis direction by electric motors MGf and MGr can be reduced (although (Da+Db) or more is required).

In the second comparison example, however, the position in the rotation axis direction of joint surface 810 of connection mechanism 570a is different from that of connection mechanism 570b. As shown at (b) in FIG. 9, therefore, irregularities occur at joint surface 810 between casings 600 and 700 as a whole, and joint surface 810 cannot be a single flat surface. Therefore, it is difficult to ensure a sealing property of the internal space.

In the structure of FIG. 7, if it is intended to employ joint surface 810 that is formed of a single flat surface without irregularities, it is necessary to arrange both connection mechanisms 570a and 570b as parts on one side, i.e., one of casings 600 and 700. In this case, it is impossible to perform an operation of connecting connection mechanisms 570a and 570b to respective electric motors MGf and MGr (lead lines 630 and 730) in the assembly process for fixing casings 600 and 700 to respective electric motors MGf and MGr. In the assembly operation of joining casings 600 and 700, it is necessary to perform both the operation of connecting connector units 560a and 560b and the operation of connecting electric motors MGf and MGr (lead lines 630 and 730). This may complicate the assembly operation and may increase a required time.

Figure 8:
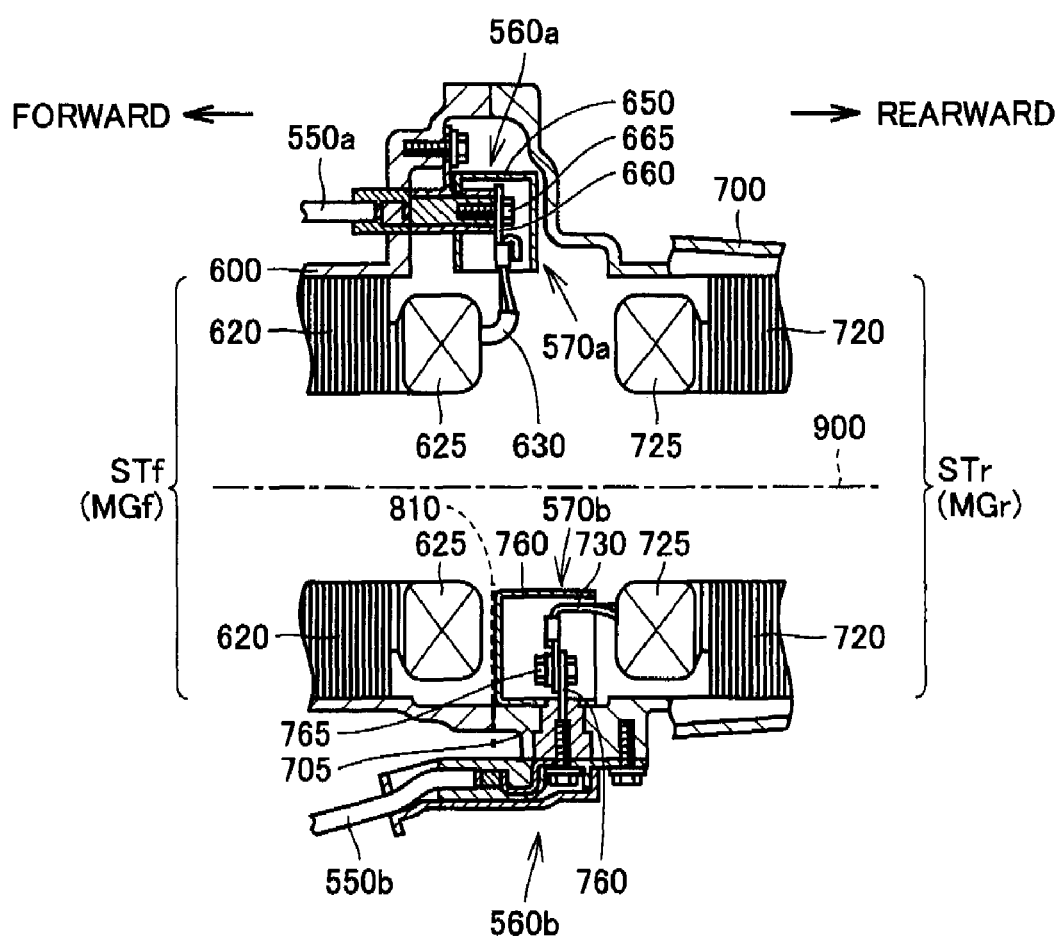
FIG. 8 is a view for comparison with FIGS. 6 and 7, and schematically shows an arrangement of the connector unit of the motor module according to the embodiment of the invention.

FIG. 8 shows an arrangement of the connector units (connection mechanisms) in the motor module according to the embodiment, for comparison with those in FIGS. 6 and 7.

Referring to FIG. 8, the motor module according to the embodiment includes electric motors MGf and MGr that neighbor to each other in the extension direction of power cable 550a and 550b extending in the same direction (from the forward side). Particularly, connection mechanism 570a of one (electric motor MGf) of these electric motors MGf and MGr is arranged in a radially outer portion, and connection mechanism 570b of the other electric motor MGr is arranged in the space between electric motors MGf and MGr.

This structure can suppress increase of the space in the rotation axis direction between electric motors MGf and MGr, as compared with FIG. 7 (second comparison example). As shown at (c) in FIG. 9, whole joint surface 810 between casings 600 and 700 can be formed of a single flat surface not including irregularities so that the sealing property of the internal space can be ensured.

Further, connection mechanism 570a can be a component on the casing 600 side, and connection mechanism 570b can be a component on the casing 700 side.

Consequently, in an assembly process shown in FIG. 10 of the motor module according to the embodiment of the invention, and particularly in a process P100 of fixing electric motor MGf to casing 600, it is possible to complete an operation of connecting coil end 625 (lead line 630) of electric motor MGf to terminal block 660 of connection mechanism 570a. Further, in a process P110 of fixing electric motor MGf to casing 700, it is possible to complete an operation of connecting coil end 725 (lead line 730) of electric motor MGr to terminal block 760 of connection mechanism 570b.

Therefore, in a process P120 of joining casings 600 and 700, it is merely required to perform only a connecting operation for the cable connectors (connector units 560a and 560b) in respective connection mechanisms 570a and 570b, and it is not necessary to perform the connecting operation for electric motors MGf and MGr. Consequently, the productivity in assembly process can be improved without complicating the operations in respective processes P100-P120.

In the motor module according to the embodiment, as described above, connection mechanisms 570a and 570b are arranged between electric motors MGf and MGr neighboring to each other in the rotation axis direction and power cables 550a and 550b extending from the same side in the rotation axis direction, and particularly connection mechanisms 570a and 570b can be arranged on the opposite sides of joint surface 810, respectively, while suppressing increase in space (i.e., a distance in the rotation axis direction) between the electric motors. Thereby, the operations of connecting connection mechanisms 570a and 570b to electric motors MGf and MGr, respectively, can be executed independently prior to the joining of casings 600 and 700 (i.e., fixing of the electric motors to the respective casings) so that the assembly workability can be improved. Further, joint surface 810 between casings 600 and 700 accommodating respective electric motors MGf and MGr can be a single surface not including irregularities so that the sealing property of the space inside the casings can be improved. As described above, it is possible to prevent increase in size of the motor module in the rotation axis direction, to ensure the sealing property at the joint surface between the casings and to improve the assembly workability.

In the structure shown in FIG. 8, it may be envisaged to arrange connection mechanism 570b of rear electric motor MGf on the radially outer side, similarly to connection mechanism 570a. In this case, however, both connection mechanisms 570a and 570b must be the parts on one side, i.e., on the side of casing 600 or 700 for reducing the size in the rotation axis direction of the motor module. As described before, the assembly operation of joining casings 600 and 700 together in the above structure requires that both the connecting operation for connector units 560a and 560b as well as the connecting operation for electric motors MGf and MGr (lead lines 630 and 730) are executed in only one of the connection mechanisms. This may complicate the assembly operations and may increase a time required for it.

(Modification)

A modification of the embodiment will now be described in connection with an example of the structure of connection mechanism 570a for executing the connection process for power cables 550a and 550b independently of the assembly process for the motor module.

According to this structure, the assembled motor modules can be transported between factories or the like by transporting the power cables independently of transportation of the motor modules. Therefore, as compared with the case where the motor module is transported together with the power cables connected thereto, it is possible to reduce a possibility that the power cables are damaged due to contact, abrasion and the like with or by another member.

In connection mechanism 570b, as can be seen from FIG. 5, connector unit 560b of power cable 550b can be coupled, by fixing members 762 such as bolts that inserted from the outside of casing 700, to a portion of terminal block 760 being attached to casing 700 that is integrated with casing 700. Thus, power cable 550b can be attached to connection mechanism 570b from the outer side of the casing, and thereby can be attached to the motor module that is already assembled by joining casings 600 and 700 together. Therefore, connection mechanism 570b is configured to allow execution of the connection process for power cable 550b independently of the assembly process for the motor module.

In connection mechanism 570a shown in FIG. 4, however, power cable 550a and connector unit 560a must be connected in the assembly process of the motor module (specifically, in process P120 in FIG. 10). Therefore, the connection process for power cable 550a cannot be independent of the assembly process for the motor module.

Referring to FIGS. 11 to 22, therefore, description will be given successively on examples of the structure of connection mechanism 570a by which the connection process for power cable 550a can be executed independently of the assembly process for the motor module.

FIG. 11 schematically shows a first example of the connection mechanism of the motor module according to a modification of the embodiment.

Referring to FIG. 11, connection mechanism 570a has terminal block 660 attached in a through-hole 604 formed at a wall portion 601 of casing 600. Wall portion 601 is a part of wall forming casing 600, and has a form extending outward in a radial direction of the rotor from the outer peripheral surface of electric motor MGf. Terminal block 660 is attached from the forward side or position (i.e., rearwardly) to casing 600 so that it extends in the rotor rotation axis direction through through-hole 604. A contact surface of terminal block 660 to be in contact with casing 600 is formed of an illustrating member (resin portion), and is internally provided with a conductor portion 662 for electrical connection between power cable 550a and lead line 630.

For confirmation, it is stated that each of terminal blocks 660 and 760 in FIGS. 4 and 5 has a contact surface formed of an insulating material for contact with casing 600 or 700 in view of safety, although a specific structure is not shown in the figures.

Terminal block 660 includes a coupling unit 661a coupled to lead line 630 by fixing member 665, and a coupling unit 661b coupled to connector unit 560a by a fixing member 666. Coupling units 661a and 661b electrically connect lead line 630, conductor portion 662 and connector unit 560a so that power cable 500a is electrically connected to electric motor MGf.

As shown in the figures, coupling unit 661a is arranged inside casing 600, and coupling unit 661b is arranged inside casing 600. In coupling unit 661b, fixing member 666 is attached from the forward side in the rotor rotation axis direction. Thus, coupling unit 661a corresponds to a "first coupling unit" in the invention, and coupling unit 661b corresponds to a "second coupling unit" in the invention.

Owing to the above structure, it is possible in connection mechanism 570a shown in FIG. 11 to couple power cable 550a extending from the outside of casing 600 to terminal block 660 already attached to casing 600. Therefore, it is possible to employ the process in which the power cable is connected from the outside of the motor module, after the completion of the assembly of the motor module. Thus, the connection process for power cable 550a can be independent of the assembly process for the motor module.

Further, power cable 550a can be connected to terminal block 660 without forming an opening (service hole) in casing 600 so that it is possible to prevent the increase in number of parts for the sealing purpose as well as oil leakage due to lowering of the sealing property.

Figure 12:
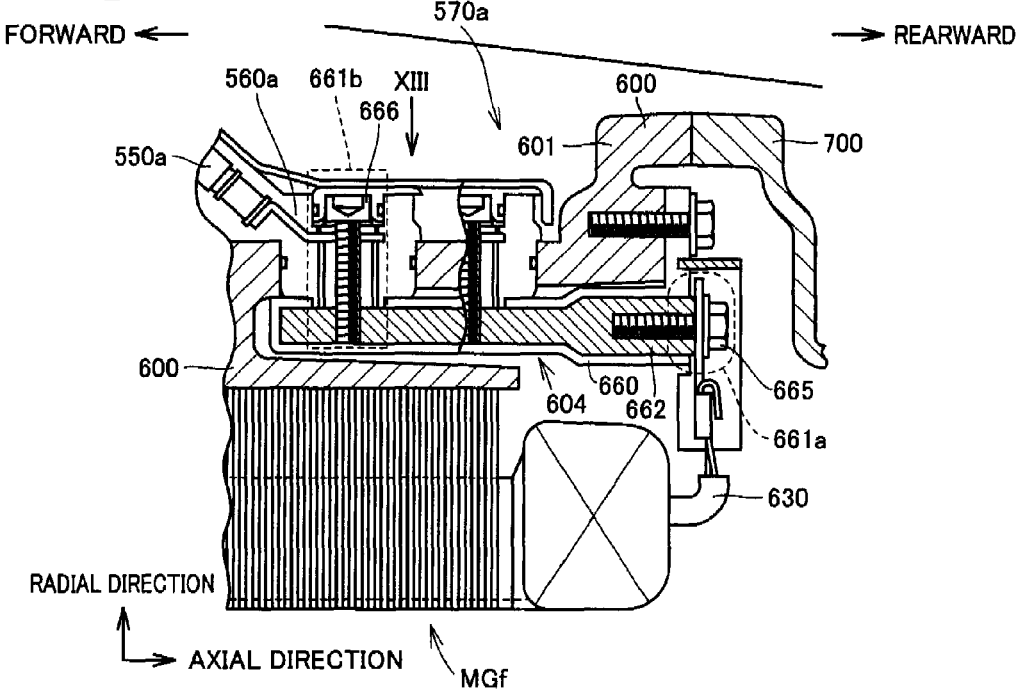
FIG. 12 schematically shows a second example of the connection mechanism of the motor module according to the modification of the embodiment of the invention.
Figure 13:
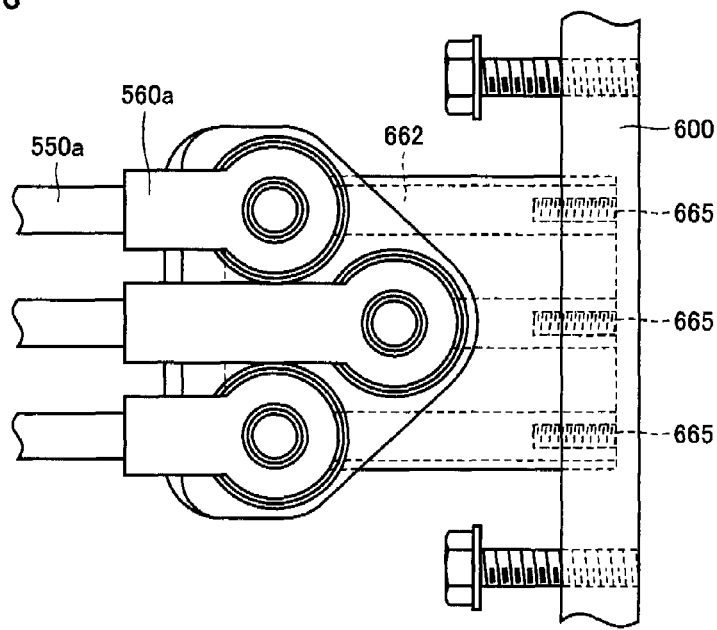
FIG. 13 is a plan of the structure in FIG. 12 viewed in a direction XIII.

FIG. 12 schematically shows a second example of the connection mechanism of the motor module according to the modification of the embodiment. FIG. 13 is a plan of the mechanism viewed in a direction XIII in FIG. 12.

Referring to FIG. 12, connection mechanism 570a has terminal block 660 attached in through-hole 604 that is formed at wall portion 601 of casing 600, similarly to the structure example in FIG. 11. In the structure of FIG. 12, terminal block 660 is attached from the rearward side or position (i.e., forwardly) to casing 600 so that it extends through through-hole 604 in the rotor rotation axis direction.

Terminal block 660 includes coupling unit 661a coupled to lead line 630 inside (i.e., in a position inside) casing 600 and coupling unit 661b coupled to connector unit 560a outside (i.e., in a position outside) casing 600.

Owing to the above structure, power cable 550a can be coupled from the outside of casing 600 to terminal block 660 that is already attached to casing 600, similarly to connection mechanism 570a shown in FIG. 11. Consequently, the connection process for power cable 550a can be independent of the assembly process for the motor module.

As can be understood from FIG. 13, connection mechanism 570a shown in FIG. 12 is configured such that the power cables and the lead lines for the three phases can be collectively connected. Therefore, connection mechanism 570a has three coupling units 661a and three coupling units 661b for the three phases, respectively. In connection with this, FIG. 11 and others show connection mechanism 570a corresponding to only one phase, and thus shows representatively the structure for only one phase among the structures that are provided in a similar fashion for the three phases, respectively.

In connection mechanism 570a shown in FIGS. 12 and 13, the operation of attaching terminal block 660 to casing 600 is performed from the rearward side in the rotor rotation axis direction, similarly to the operation of attaching lead line 630 to terminal block 660. Thus, after attaching electric motor MGf to casing 600, the operations can be performed in the same direction (i.e., in the same rotor rotation axis direction) for attaching terminal block 660 to casing 600 and connecting lead line 630 to terminal block 660, without inverting casing 600 and electric motor MGf. This improves the workability.

In connection mechanism 570a in FIG. 12, fixing member 666 can be attached in a radial direction, i.e., perpendicularly to the rotor rotation axis direction. Therefore, it is not necessary to perform the attaching operation in the rotor rotation axis direction on casing 600 that diverges forwardly, through the available working space that cannot be ensured without difficulty. Therefore, the operation of attaching fixing member 666 can be easy. Thus fixing member 666 corresponds to a "second fixing member" in the invention.

Figure 14:
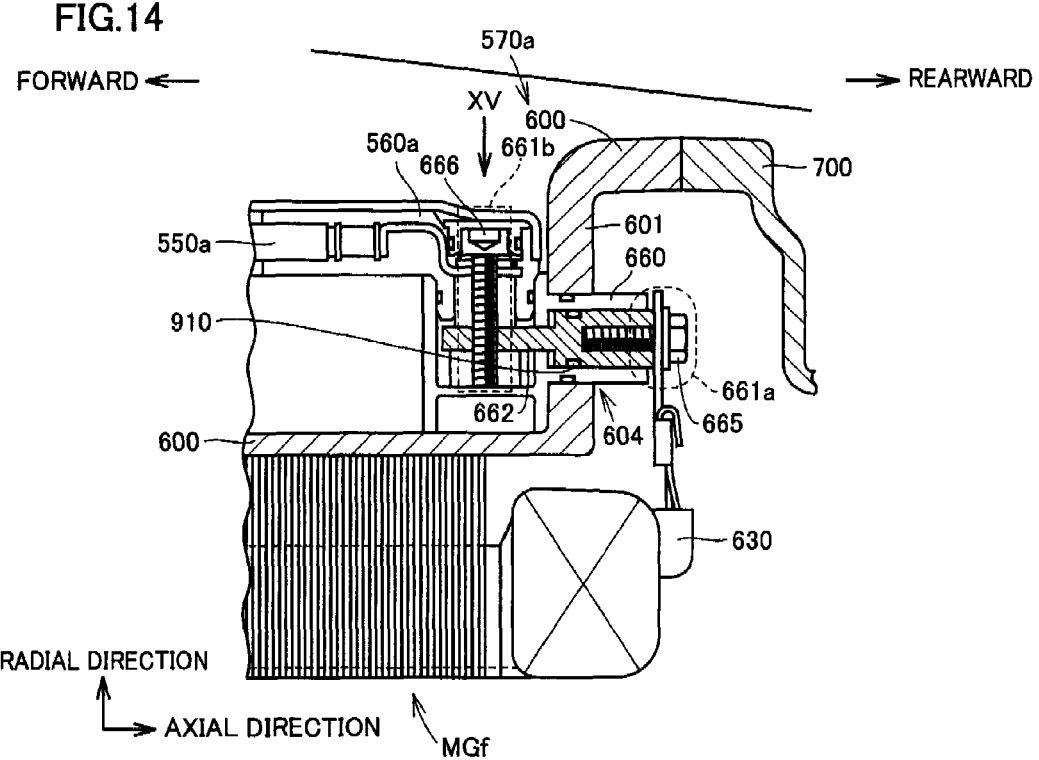
FIG. 14 schematically shows a third example of the connection mechanism of the motor module according to the modification of the embodiment of the invention.
Figure 15:
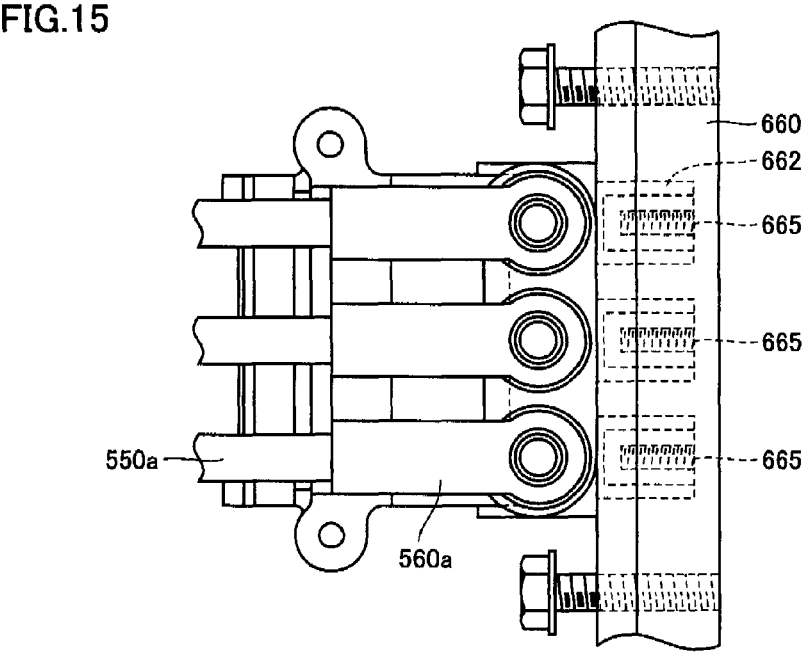
FIG. 15 is a plan of the structure in FIG. 14 viewed in a direction XV.

FIG. 14 is a schematic view showing a third example of the connection mechanism of the motor module according to the modification of the embodiment. FIG. 15 is a plan of the mechanism viewed in a direction XV in FIG. 14.

Referring to FIG. 14, connection mechanism 570a has terminal block 660 attached in through-hole 604 formed at wall portion 601 of casing 600, similarly to the structure example in FIGS. 11 and 12. Also, terminal block 660 includes coupling unit 661a that is coupled to lead line 630 inside casing 600 as well as coupling unit 661b that is coupled to connector unit 560a outside casing 600.

Similarly to connection mechanism 570a shown in FIG. 11, therefore, power cable 550a can be coupled from the outside of casing 600 to terminal block 660 that is already attached to casing 600. Consequently, the connection process for power cable 550a can be independent of the assembly process for the motor module, and it is not necessary to form an opening (service hole) at casing 600. Further, fixing member 666 can be attached perpendicularly to the rotor rotation axis direction, which facilitates the operation of attaching fixing member 666.

In the structure of FIG. 14, terminal block 660 is attached from the forward side in the rotor rotation axis direction in through-hole 604.

As can be seen from FIG. 15, connection mechanism 570a shown in FIG. 14 is configured such that the power cables and the lead lines for the three phases can be collectively connected, similarly to FIG. 12. Particularly, in connection mechanism 570a in FIG. 14, coupling units 661b are located in the same position in the rotor rotation axis direction. Consequently, the power cables 550a for the three phases can have the same length, as can be understood from the comparison between FIGS. 15 and 13. Therefore, parts can be standardized to reduce the cost.

In terminal block 660, since a space for arranging a sealing member 910 such as an O-ring is present between the resin portion and the conductor portion, the sealing property can be ensured without requiring molding of resin or the like for forming conductor portion 662 of terminal block 660. Therefore, the cost can be reduced.

Figure 16:
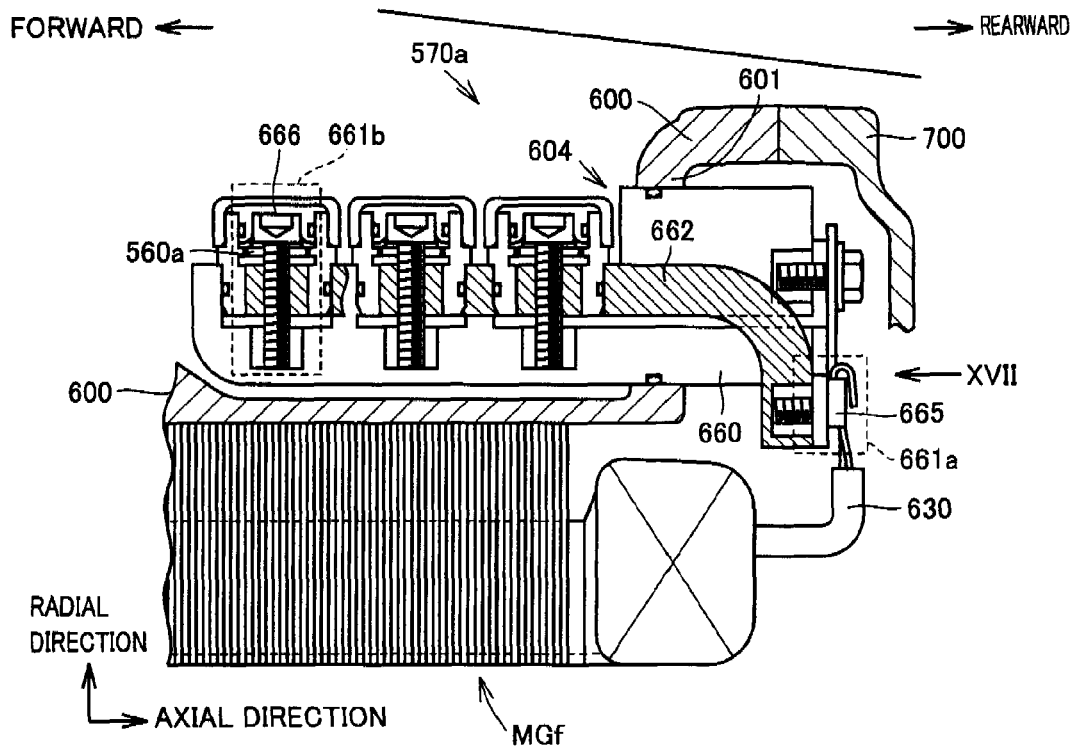
FIG. 16 schematically shows a fourth example of the connection mechanism of the motor module according to the modification of the embodiment of the invention.
Figure 17:
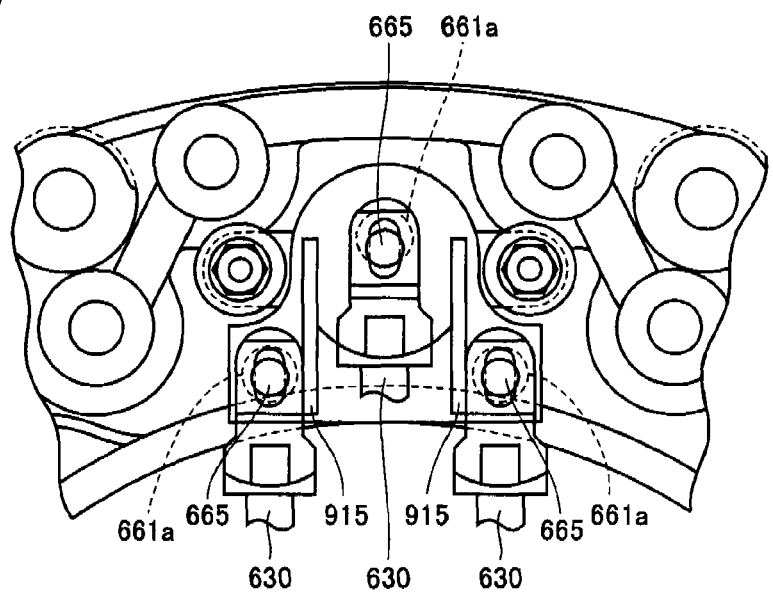
FIG. 17 is a plan of the structure in FIG. 14 viewed in a direction XVII.

FIG. 16 is a schematic diagram showing a fourth example of the connection mechanism of the motor module according to the modification of the embodiment. FIG. 17 is a plan of the mechanism viewed in a direction XVII in FIG. 16.

Referring to FIG. 16, connection mechanism 570a has a structure similar to the structure examples in FIGS. 11, 12 and 14, and includes terminal block 660 that is attached in through-hole 604 formed at wall portion 601 of casing 600. Terminal block 660 includes coupling unit 661a coupled to lead line 630 inside casing 600 and coupling unit 661b coupled to connector unit 560a outside casing 600.

Therefore, similarly to connection mechanism 570a shown in FIGS. 11, 12 and 14, power cable 550a can be coupled from the outside of casing 600 to terminal block 660 that is already attached to casing 600. Consequently, the connection process for power cable 550a can be independent of the assembly process for the motor module, and it is not necessary to form an opening (service hole) at casing 600. Similarly to FIG. 14 and the like, fixing member 666 in coupling unit 661b is attached perpendicularly to the rotor rotation axis direction so that the assembly operation can be easy.

Similarly to FIGS. 12 and 14, the power cables and the lead lines for the three phases can be collectively connected. However, coupling units 661b are aligned to each other in the rotor rotation axis direction. Thus, connector unit 560a of power cable 550a of each phase extends perpendicularly to the sheet of FIG. 16 from the reverse side of the sheet toward the forward side, and is coupled to conductor portion 662 by coupling unit 661b. Similarly to FIG. 12, the direction of the operation of attaching terminal block 660 to casing 600 is the same (from the rearward side) as that of the operation of attaching lead line 630 to terminal block 660. This improves the workability.

As shown in FIG. 17, connection mechanism 570a in FIG. 16 is provided with coupling units 661a for coupling lead lines 630 by fixing members 665, and these coupling units 661a for the three phases are arranged collectively. Insulating members 915 are arranged between coupling units 661a of the three phases.

Figure 18:
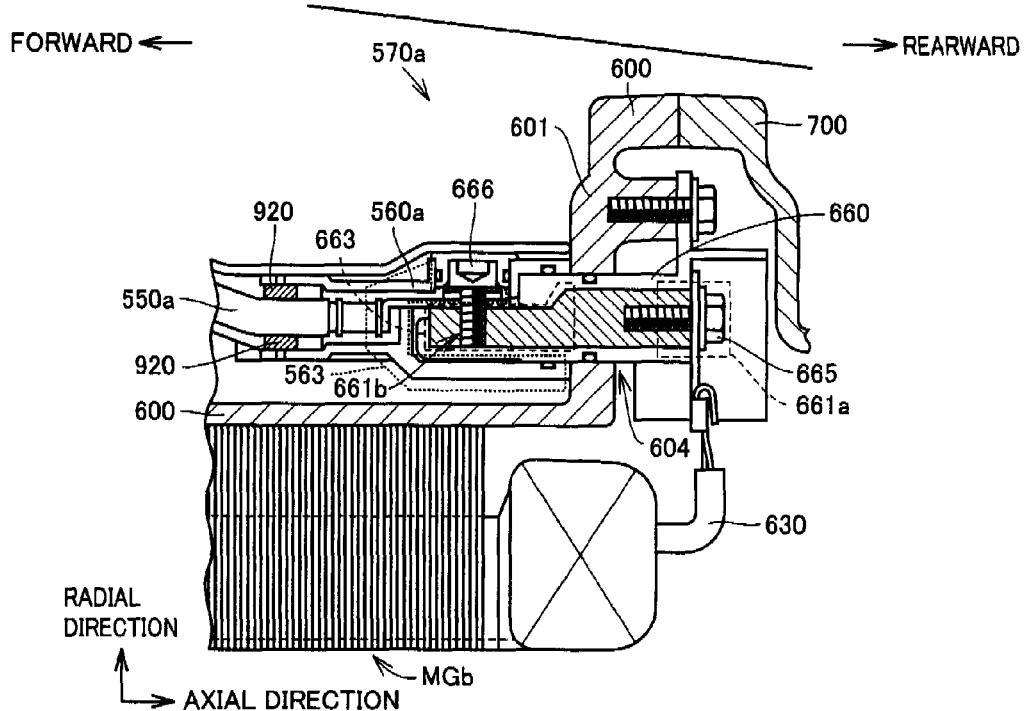
FIG. 18 schematically shows a fifth example of the connection mechanism of the motor module according to the modification of the embodiment of the invention.

FIG. 18 schematically shows a fifth example of the connection mechanism of the motor module according to the modification of the embodiment.

Referring to FIG. 18, connection mechanism 570a has a structure similar to the structure examples in FIGS. 11, 12, 14 and 16, and includes terminal block 660 that is attached in through-hole 604 formed at wall portion 601 of casing 600. Terminal block 660 includes coupling unit 661a coupled to lead line 630 inside casing 600 and coupling unit 661b coupled to connector unit 560a outside casing 600.

Therefore, similarly to connection mechanism 570a shown in FIGS. 11, 12, 14 and 16, power cable 550a can be coupled from the outside of casing 600 to terminal block 660 that is already attached to casing 600. Consequently, the connection process for power cable 550a can be independent of the assembly process for the motor module, and it is not necessary to form an opening (service hole) at casing 600.

Similarly to FIG. 12, the direction of the operation of attaching terminal block 660 to casing 600 is the same (from the rearward side) as that of the operation of attaching lead line 630 to terminal block 660. This improves the workability.

Similarly to FIG. 14 and the like, fixing member 666 in coupling unit 661*b* is attached perpendicularly to the rotor rotation axis direction so that the assembly operation can be easy.

Further, terminal block 660 is provided at a portion near coupling unit 661*b* with a convex portion 663 that protrudes in the rotor rotation axis direction through through-hole 604 toward the outside of casing 600. Further, connector unit 560*a* is provided at its end portion with a concave portion 563 complementary to convex portion 663. In the state where concave and convex portions 563 and 663 are fitted with each other, connector unit 560*a* is coupled to terminal block 660 in coupling unit 661*a* by fixing member 666 that is attached perpendicularly to the rotor rotation axis direction.

Owing to this structure, connector unit 560*a* and terminal block 660 can be arranged substantially on the same axis. Thereby, the radial size of coupling unit 661*b* can be small. Also, a sealing member 920 such as a rubber ring can ensure the sealing property for connector unit 560*a* so that the molding of resin or the like is not required, and the cost can be reduced.

Although not shown in FIG. 18, terminal block 660 has a space for arranging a sealing member between a resin portion and a conductor portion similarly to FIG. 14. Therefore, the sealing property can be ensured without employing molding of resin or the like for forming conductor portion 662 of terminal block 660.

Figure 19:
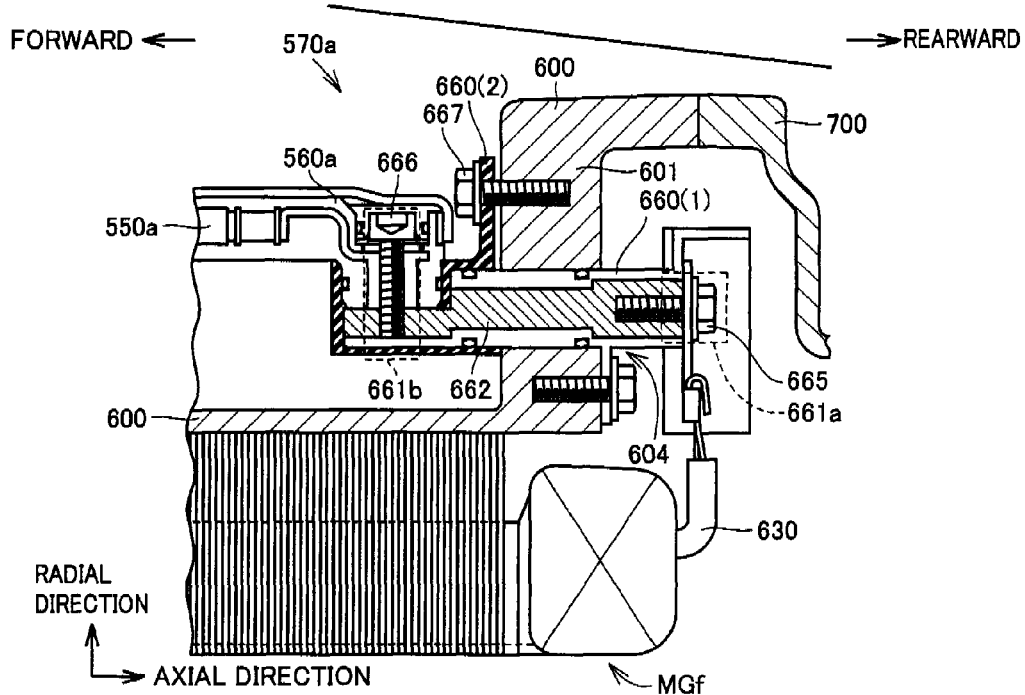
FIG. 19 schematically shows a sixth example of the connection mechanism of the motor module according to the modification of the embodiment of the invention.

FIG. 19 schematically shows a sixth example of the connection mechanism of the motor module according to the modification of the embodiment.

Referring to FIG. 19, connection mechanism 570*a* has terminal block 660 formed of terminal block units 660(1) and 660(2). Similarly to terminal block 660 in FIGS. 11, 12, 14 and 16, terminal block unit 660(1) is attached in through-hole 604 formed at wall portion 601 of casing 600, and includes coupling unit 661*a* coupled to lead line 630 inside casing 600 and coupling unit 661*b* coupled to connector unit 560*a* outside casing 600. Terminal block unit 660(2) formed of an insulating member is fixed to casing 600 by a fixing member 667.

Further, in coupling unit 661*b*, connector unit 560*a* is attached to terminal block 660 with terminal block unit 660(2) arranged in a space between it and terminal block unit 660(1). Thus, terminal block unit 660(2) has a form serving as an adapter that fills a space between terminal block unit 660(1) and connector unit 560*a* in the operation of attaching connector unit 560*a* to terminal block unit 660(1).

Therefore, connection mechanism 570*a* in FIG. 19 is likewise configured such that power cable 550*a* can be coupled from the outside of casing 600 via terminal block unit 660(2) to terminal block units 660(1) and 660(2) that are already attached to casing 600 in the assembly process of the motor module. Consequently, the connection process for power cable 550*a* can be independent of the assembly process for the motor module, similarly to connection mechanism 570*a* shown in FIGS. 11, 12, 14, 16 and 18, and also it is not necessary to form an opening (service hole) at casing 600. Since terminal block unit 660(1) is attached from the rearward side to casing 600, the workability for such attaching is improved.

Further, by using terminal block unit 660(2) as an adapter, connection mechanism 570*a* can be applied to various types of modules in the following manner. Thus, the forms of at least power cable 550*a* and connector unit 560*a* can be standardized, and the forms of terminal block unit 660(2) are designed corresponding to the respective types of the module. Thereby the parts can be standardized for various types.

Figure 20:
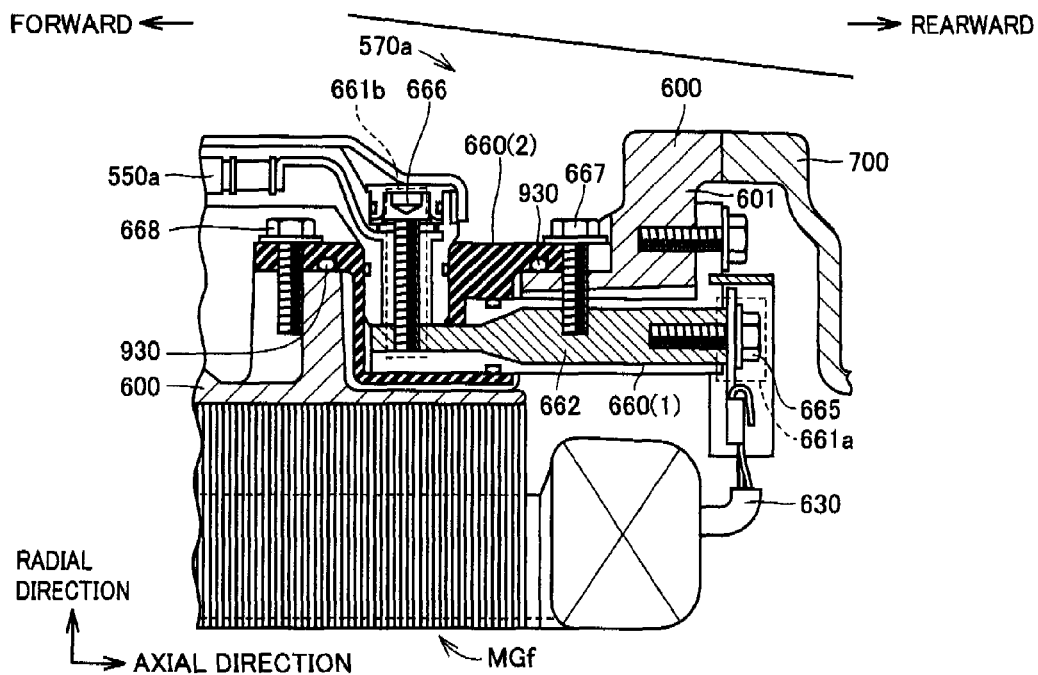
FIG. 20 schematically shows a seventh example of the connection mechanism of the motor module according to the modification of the embodiment of the invention.

FIG. 20 schematically shows a seventh example of the connection mechanism of the motor module according to the modification of the embodiment.

Referring to FIG. 20, connection mechanism 570*a* has terminal block 660 formed of terminal block units 660(1) and 660(2), similarly to FIG. 19. Terminal block unit 660(1) is attached in through-hole 604 formed at wall portion 601 of casing 600, similarly to FIG. 19, and includes coupling unit 661*a* coupled to lead line 630 inside casing 600 and coupling unit 661*b* coupled to connector unit 560*a* outside casing 600.

Therefore, connection mechanism 570*a* in FIG. 20 is configured similarly to connection mechanism 570*a* shown in FIG. 19 such that power cable 550*a* can be coupled from the outside of casing 600 via terminal block unit 660(2) to terminal block units 660(1) and 660(2) that are already attached to casing 600 in the assembly process of the motor module.

Consequently, the connection process for power cable 550*a* can be independent of the assembly process for the motor module, and it is not necessary to form an opening (service hole) at casing 600. Since terminal block unit 660(1) is attached from the rearward side to casing 600, the workability of such attaching is improved.

Further, by using terminal block unit 660(2) as an adapter for canceling a difference in form between the types, the forms of at least power cable 550*a* and connector unit 560*a* can be standardized when connection mechanism 570*a* is to be applied to various types of modules.

In the structure shown in FIG. 20, terminal block unit 660(2) has a form covering terminal block unit 660(1), and is fixed to casing 600 by fixing members 667 and 668. Further, a sealing member 930 functions in a plane fashion between terminal block 660 and casing 600 so that the sealing property is improved. In the structure of FIG. 20, since both fixing members 667 and 668 are attached perpendicularly to the rotor rotation axis direction, the attaching operation for terminal block unit 660(2) can be easier than that in the structure shown in FIG. 19.

Figure 21:
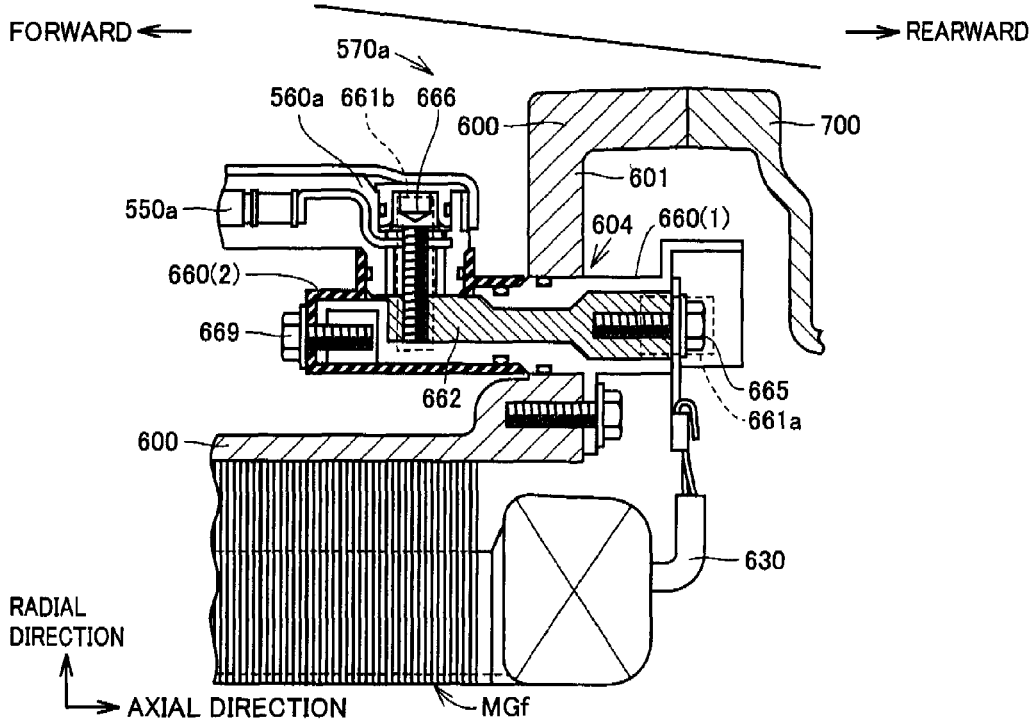
FIG. 21 schematically shows an eighth example of the connection mechanism of the motor module according to the modification of the embodiment of the invention.

FIG. 21 schematically shows an eighth example of the connection mechanism of the motor module according to the modification of the embodiment.

Referring to FIG. 21, connection mechanism 570*a* has terminal block 660 formed of terminal block units 660(1) and 660(2) similarly to FIGS. 19 and 20. Similarly to FIGS. 19 and 20, terminal block unit 660(1) is attached in through-hole 604 formed at wall portion 601 of casing 600, and includes coupling unit 661*a* coupled to lead line 630 inside casing 600 and coupling unit 661*b* coupled to connector unit 560*a* outside casing 600.

Therefore, connection mechanism 570*a* in FIG. 21 is configured similarly to connection mechanism 570*a* shown in FIG. 19 and others such that power cable 550*a* can be coupled from the outside of casing 600 via terminal block unit 660(2) to terminal block units 660(1) and 660(2) that are already attached to casing 600 in the assembly process of the motor module.

Consequently, the connection process for power cable 550*a* can be independent of the assembly process for the motor module, and it is not necessary to form an opening (service hole) at casing 600. Since terminal block unit 660(1) is attached from the rearward side to casing 600, the workability of such attaching is improved.

Further, by using terminal block unit 660(2) as an adapter for canceling a difference in form between the types, the forms of at least power cable 550*a* and connector unit 560*a* can be standardized when connection mechanism 570a is to be applied to various types of modules.

In the structure shown in FIG. 21, terminal block unit 660(2) is not fixed to casing 600 but is fixed to terminal block unit 660(1) by a fixing member 669. Thus, fixing member 669 corresponds to "fixing means" in the invention. Thereby, casing 600 does not require tapping for attaching a fixing member (bolt) so that the workability of the casing can be improved.

Figure 22:
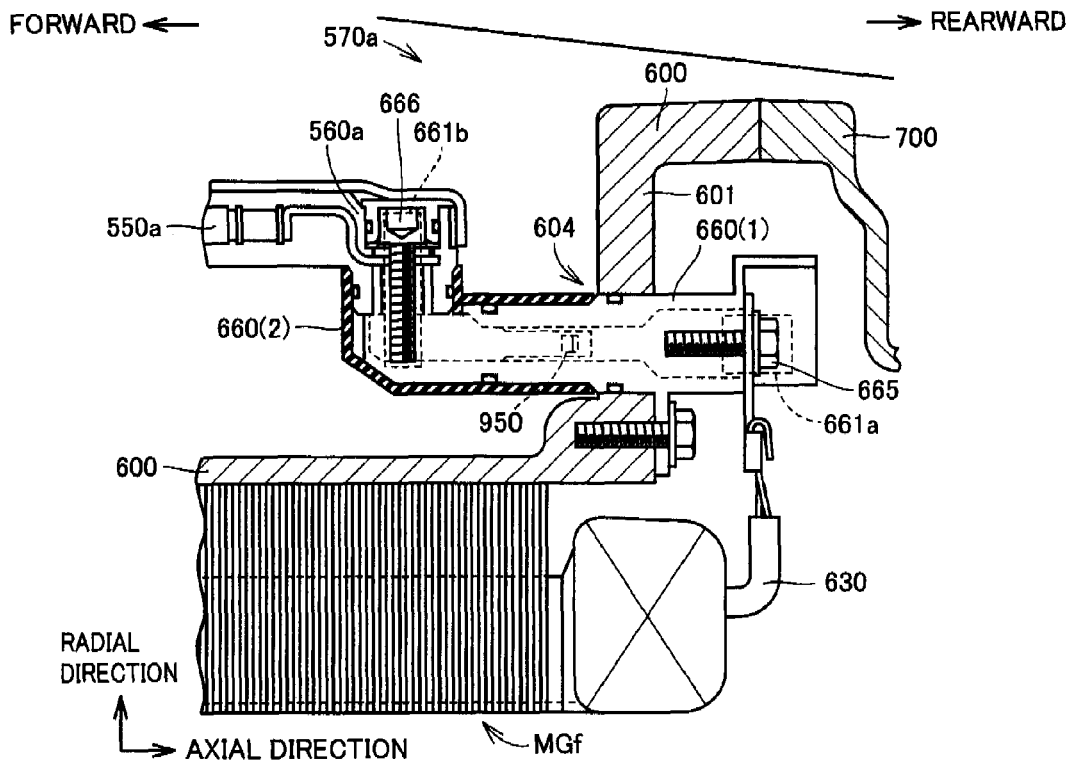
FIG. 22 schematically shows a ninth example of the connection mechanism of the motor module according to the modification of the embodiment of the invention.

FIG. 22 schematically shows a ninth example of the connection mechanism of the motor module according to the modification of the embodiment.

Referring to FIG. 22, connection mechanism 570a has terminal block 660 formed of terminal block units 660(1) and 660(2) similarly to FIGS. 19 to 21. Similarly to FIGS. 19 to 21, terminal block unit 660(1) is attached in through-hole 604 formed at wall portion 601 of casing 600, and includes coupling unit 661a coupled to lead line 630 inside casing 600 and coupling unit 661b coupled to connector unit 560a outside casing 600.

Therefore, connection mechanism 570a in FIG. 22 is configured similarly to connection mechanism 570a shown in FIG. 19 and others such that power cable 550a can be coupled from the outside of casing 600 via terminal block unit 660(2) to terminal block units 660(1) and 660(2) that are already attached to casing 600 in the assembly process of the motor module.

Consequently, the connection process for power cable 550a can be independent of the assembly process for the motor module, and it is not necessary to form an opening (service hole) at casing 600. Since terminal block unit 660(1) is attached from the rearward side to casing 600, the workability of such attaching is improved.

Further, by using terminal block unit 660(2) as an adapter for canceling a difference in form between the types, the forms of at least power cable 550a and connector unit 560a can be standardized when connection mechanism 570a is to be applied to various types of modules.

In the structure shown in FIG. 22, terminal block unit 660(2) that is attached to surround the outer periphery of terminal block unit 660(1) is fixed to terminal block unit 660(1) by a lock mechanism 950 without arranging fixing member 669 (FIG. 21). Thus, lock mechanism 950 corresponds to the "fixing means" in the invention.

For example, as a general mechanism, terminal block unit 660(1) may be provided at its outer periphery with a groove (not shown), and terminal block unit 660(2) may be provided at a corresponding portion with an engagement unit (not shown) for fitting and engaging with the groove. Thereby, lock mechanism 950 can be formed.

Thereby, casing 600 does not require tapping for attaching a fixing member (bolt) similarly to the structure in FIG. 21 so that the workability of the casing can be improved. Further, the attaching operation for the fixing member is not required, and the assembly operation for terminal block units 660(1) and 660(2) can be easily executed with lock mechanism 950. Therefore, the connecting operation for power cable 550a is performed using only fixing member 666 that is attached perpendicularly to the rotor rotation axis direction so that the workability thereof is improved.

Figure 23:
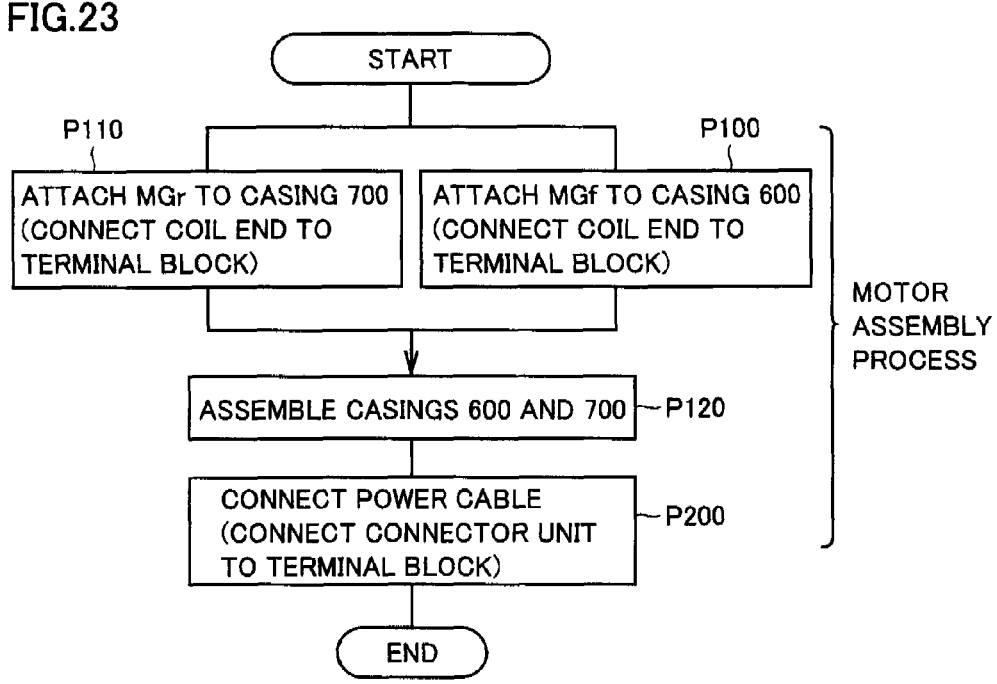
FIG. 23 is a flowchart insulating an assembly process of the motor module according to the modification of the embodiment of the invention.

Referring to FIG. 23, description will now be given on the assembly process for the motor module according to the modifications of the embodiment of the invention already described with reference to FIGS. 11 to 22.

Referring to FIG. 23, in the assembly process for the motor module according to the modification of the embodiment of the invention, the operation of connecting coil end 625 (lead line 630) of electric motor MGf to terminal block 660 of connection mechanism 570a can be completed in process P100 of attaching electric motor MGf to casing 600, similarly to FIG. 10. Also, in process P110 of attaching electric motor MGf to casing 700, it is possible to complete the operation of connecting coil end 725 (lead line 730) of electric motor MGr to terminal block 760 of connection mechanism 570b. Further, the assembly process for the motor module is completed by process P120 of joining casings 600 and 700, without connecting power cables 550a and 550b.

In process P200 after the completion of the assembly of the motor module, the operation of connecting power cables 550a and 550b (connector units 560a and 560b) is performed on connection mechanisms 570a and 570b, respectively. Consequently, when the assembled motor module is to be transported between factories or the like, the power cables can be transported independently of the motor module. Thereby, the power cables can be protected to a higher extent, as compared with the case where the power cables are transported after these are attached to motor module.

The motor module according to the invention can be commonly applied to other types of motors mounted on hybrid vehicles, motors mounted on other types of cars, vehicles apparatuses and the like, provided that these have a layout structure in which the power cables extend from the same side in the rotor rotation axis direction to a plurality of motors that neighbor to each other in the rotor rotation axis direction.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The motor module according to the invention can be applied to other types of motors mounted on hybrid vehicles as well as motors mounted on other types of cars, vehicles apparatuses and the like.

The invention claimed is:
1. A motor module comprising:
first and second electric motors neighboring to each other in a rotor rotation axis direction;
a first casing for accommodating said first electric motor;
a second casing for accommodating said second electric motor;
joining means for joining said first and second casings accommodating said first and second electric motors, respectively, to each other;
a first connection mechanism for electrically connecting a first power cable supplying an electric power to said first electric motor to said first electric motor; and
a second connection mechanism for electrically connecting a second power cable supplying an electric power to said second electric motor to said second electric motor, wherein
said first and second power cables are arranged from the same side in said rotor rotation axis direction,
said first connection mechanism is arranged using a space radially outside said first electric motor, and
said second connection mechanism is arranged using a space between said first and second electric motors neighboring to each other.
2. The motor module according to claim 1, wherein
said first connection mechanism is arranged at said first casing, and said second connection mechanism is arranged at said second casing.

3. The motor module according to claim 2, wherein said first and second casings are configured to form an internal space continuing in said first and second casings joined together by said joining means, and a joint surface between said casings is formed of a single plane without irregularities.

4. The motor module according to claim 1, wherein said first connection mechanism includes:

a terminal block configured to be electrically connected to said first power cable when said first power cable is connected to said first connection mechanism, and a first fixing member fastening a lead line of a coil winding of said first electric motor to said terminal block and thereby connecting electrically said terminal block to said lead line; and said lead line fastened to said terminal block extends across said rotor rotation axis direction.

5. The motor module according to claim 4, wherein said first casing has a form extending outward beyond an outer peripheral surface of said first electric motor, and has a wall portion provided with a through-hole for extending said terminal block through said through-hole in said rotor rotation axis direction, and said terminal block includes:

a first coupling unit coupled to said lead line in a position inside said first casing and inner than said wall portion, and a second coupling unit coupled to said first power cable in a position outside said first casing.

6. The motor module according to claim 4, wherein said terminal block is configured to be attached to said first casing in the same direction, with respect to said rotor rotation axis direction, as that of fastening said lead line to said terminal block by said first fixing member.

7. The motor module according to claim 5, wherein said first connection mechanism further includes a second fixing member configured to connect electrically said first power cable and said terminal block together by fixing said first power cable to said terminal block, and said second fixing member fixes said first power cable to said terminal block in a direction perpendicular to said rotor rotation axis direction in said second coupling unit.

8. The motor module according to claim 5, wherein said terminal block has a convex portion protruding toward an outside of said first casing through said through-hole in said rotor rotation axis direction, said first power cable has a connector unit of a concave form complementary to said convex portion, and said convex portion unit is fitted to said convex form of said connector unit in said coupling unit.

9. The motor module according to claim 5, wherein said terminal block includes:

a first terminal block unit arranged to extend through said through-hole in said rotor rotation axis direction and having said first coupling unit, and a second terminal block unit coupled to said first terminal block unit in a position outside said first casing, and having said second coupling unit.

10. The motor module according to claim 9, wherein said terminal block further includes fixing means for fixing said second terminal block unit to said first terminal block unit.

* * * * *